United States Patent
Livhits et al.

(10) Patent No.: US 11,556,942 B2
(45) Date of Patent: *Jan. 17, 2023

(54) CONTENT CONSUMPTION MONITOR

(71) Applicant: BOMBORA, INC., New York, NY (US)

(72) Inventors: Anthony Livhits, Forest Hills, NY (US); Cynthia Huynh, Nutley, NJ (US); Hassan Ahmed, Brooklyn, NY (US); Benny Lin, Brooklyn, NY (US); Robert Armstrong, Brooklyn, NY (US); Erik Matlick, New York, NY (US); Mark Herschberg, New York, NY (US)

(73) Assignee: BOMBORA, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,309

(22) Filed: Sep. 14, 2020

(65) Prior Publication Data

US 2020/0410514 A1   Dec. 31, 2020

Related U.S. Application Data

(63) Continuation of application No. 15/900,208, filed on Feb. 20, 2018, now Pat. No. 10,810,604, which is a
(Continued)

(51) Int. Cl.
*G06Q 30/02* (2012.01)

(52) U.S. Cl.
CPC ..... *G06Q 30/0201* (2013.01); *G06Q 30/0269* (2013.01)

(58) Field of Classification Search
None
See application file for complete search history.

(56) References Cited

U.S. PATENT DOCUMENTS 7,185,065 B1   2/2007   Holtzman
7,949,646 B1   5/2011   Bangalore
(Continued)

FOREIGN PATENT DOCUMENTS

WO   2014/054052 A2   4/2014
WO   2017/1169493 A1   7/2017

OTHER PUBLICATIONS

Cheng et al "A design of three-dimensional spatial data model and its data structure in geological exploration engineering", Dec. 1999, Geo-spatial Information Science, pp. 78-85 (Year: 1999).*
(Continued)

*Primary Examiner* — Romain Jeanty
(74) *Attorney, Agent, or Firm* — Schwabe, Williamson & Wyatt, PC

(57) ABSTRACT

A content consumption monitor (CCM) generates intent data that identifies topics of real-time interest to users. The CCM uses the intent data to direct information to more interested audiences and reduce the information noise/overload that may prevent users from viewing information. This targeted information may increase user conversion rates for seminars, advertising, documents downloads, or any other activity associated with published information. In one example, the CCM generates the intent data from third party content. Using a wide variety of third party content enables the CCM to better identify current user interests. The CCM may aggregate the intent data for different demographics, such as for companies, job positions, age, gender, or geographic locations.

23 Claims, 8 Drawing Sheets

Related U.S. Application Data continuation of application No. 14/498,056, filed on Sep. 26, 2014, now Pat. No. 9,940,634.

(56) References Cited

U.S. PATENT DOCUMENTS

| | | | |
|---|---|---|---|
| 8,392,252 B2 | 3/2013 | Kaufman | |
| 8,392,543 B1 | 3/2013 | Singh | |
| 8,494,685 B2* | 7/2013 | Shaffer | G06F 9/50 |
| | | | 700/291 |
| 8,494,897 B1 | 7/2013 | Dawson | |
| 8,566,152 B1 | 10/2013 | Shaw | |
| 8,577,486 B2* | 11/2013 | Unver | G06Q 10/06313 |
| | | | 700/95 |
| 8,613,089 B1 | 12/2013 | Holloway | |
| 8,725,712 B2 | 5/2014 | Arrasvuori | |
| 8,745,647 B1 | 6/2014 | Shin | |
| 9,092,829 B2 | 7/2015 | Fleischman | |
| 9,152,970 B1 | 10/2015 | Trahan | |
| 9,177,142 B2 | 11/2015 | Montoro | |
| 9,514,368 B2 | 12/2016 | Pitt | |
| 9,514,461 B2 | 12/2016 | George | |
| 9,521,157 B1 | 12/2016 | D'Aveta | |
| 9,560,423 B1 | 1/2017 | Chang | |
| 9,667,733 B2 | 5/2017 | Dhawan | |
| 9,706,008 B2 | 7/2017 | Rajan | |
| 9,753,923 B2 | 9/2017 | Fleischman | |
| 9,779,144 B1 | 10/2017 | Hampson | |
| 9,940,634 B1 | 4/2018 | Livhits | |
| 10,430,806 B2 | 10/2019 | Chang | |
| 10,810,604 B2 | 10/2020 | Livhits | |
| 2002/0173971 A1 | 11/2002 | Stirpe | |
| 2003/0154398 A1 | 8/2003 | Eaton | |
| 2004/0128365 A1* | 7/2004 | Motoyama | G06F 16/3347 |
| | | | 707/E17.08 |
| 2004/0267723 A1 | 12/2004 | Bharat | |
| 2006/0064411 A1 | 3/2006 | Gross | |
| 2007/0124202 A1 | 5/2007 | Simons | |
| 2007/0156392 A1 | 7/2007 | Balchandran | |
| 2008/0126178 A1 | 5/2008 | Moore | |
| 2009/0216741 A1 | 8/2009 | Thrall | |
| 2010/0100537 A1 | 4/2010 | Druzgalski | |
| 2010/0161613 A1 | 6/2010 | Rao | |
| 2010/0250341 A1 | 9/2010 | Hauser | |
| 2010/0293057 A1 | 11/2010 | Haveliwala | |
| 2011/0035287 A1* | 2/2011 | Fox | G06Q 30/02 |
| | | | 705/26.1 |
| 2011/0227699 A1 | 9/2011 | Seth | |
| 2011/0252427 A1 | 10/2011 | Olston | |
| 2011/0320715 A1 | 12/2011 | Ickman | |
| 2012/0158693 A1 | 6/2012 | Papadimitriou | |
| 2012/0209795 A1 | 8/2012 | Glickman | |
| 2012/0215640 A1 | 8/2012 | Ramer | |
| 2012/0233045 A1* | 9/2012 | Verfuerth | H05B 47/16 |
| | | | 705/34 |
| 2012/0323938 A1* | 12/2012 | Skeen | H04L 65/61 |
| | | | 707/754 |
| 2013/0066677 A1 | 3/2013 | Killoh | |
| 2013/0067070 A1 | 3/2013 | Rowe | |
| 2013/0073473 A1 | 3/2013 | Heath | |
| 2013/0124193 A1 | 5/2013 | Holmberg | |
| 2013/0132339 A1 | 5/2013 | Mirus | |
| 2013/0151687 A1 | 6/2013 | Mooneyham | |
| 2013/0159505 A1 | 6/2013 | Mason | |
| 2013/0204663 A1 | 8/2013 | Kahlow | |
| 2013/0216134 A1 | 8/2013 | Yu | |
| 2013/0297338 A1 | 11/2013 | Urmann | |
| 2013/0311236 A1* | 11/2013 | Takahashi | G06Q 30/0202 |
| | | | 705/7.31 |
| 2014/0067831 A1 | 3/2014 | Swamidas | |
| 2014/0067855 A1* | 3/2014 | Shartzer | H04H 60/31 |
| | | | 707/769 |
| 2014/0095966 A1 | 4/2014 | Burkard | |
| 2014/0096035 A1 | 4/2014 | Hall | |
| 2014/0156681 A1 | 6/2014 | Lee | |
| 2014/0201061 A1 | 7/2014 | Sivacki | |
| 2014/0201240 A1 | 7/2014 | Andavarapu | |
| 2014/0229164 A1 | 8/2014 | Martens | |
| 2014/0236669 A1 | 8/2014 | Milton | |
| 2014/0278308 A1 | 8/2014 | Liu | |
| 2014/0278916 A1 | 9/2014 | Nukala | |
| 2014/0278959 A1 | 9/2014 | Nukala | |
| 2014/0279711 A1* | 9/2014 | Angelis | G06Q 10/06 |
| | | | 705/412 |
| 2014/0280549 A1 | 9/2014 | Rajan | |
| 2014/0280890 A1 | 9/2014 | Yi | |
| 2014/0317098 A1* | 10/2014 | Jain | G06F 16/248 |
| | | | 707/723 |
| 2014/0325030 A1 | 10/2014 | Maharajh | |
| 2015/0074131 A1 | 3/2015 | Fernandez | |
| 2015/0309965 A1 | 10/2015 | Brav | |
| 2016/0048880 A1 | 2/2016 | Linden | |
| 2016/0132906 A1 | 5/2016 | Khavronin | |
| 2016/0371725 A1 | 12/2016 | Nguyen | |
| 2017/0031907 A1 | 2/2017 | Juang | |
| 2017/0364931 A1 | 12/2017 | Khavronin | |
| 2018/0101860 A1 | 4/2018 | Fleming | |
| 2018/0174163 A1 | 6/2018 | Livhits | |
| 2018/0365710 A1 | 12/2018 | Halecky | |
| 2019/0050874 A1 | 2/2019 | Matlick | |
| 2019/0294642 A1 | 9/2019 | Matlick | |

OTHER PUBLICATIONS

Burby, et al. "Web Analytics Definitions" Web Analytics Association; version 4.0; Aug. 23, 2007; XP055505869; retrieved from the Internet on Sep. 10, 2018 at: <https://www.digitalanalyticsassociation.org/Files/PDF_standards/WebAnalyticsDefinitionsVol1.pdf>

Extended European Search Report for EP App. No. 16882214.6 dated Jul. 4, 2019; 9 pages.

Extended European Search Report for EP App. No. 18190771.8 dated Oct. 22, 2018; 8 pages.

Hamilton, et al., "Inductive Representation Learning on Large Graphs" 31st Conference on Neural Information Processing Systems (NIPS 2017), Long Beach, CA, USA; available on the Internet at <https://cs.stanford.edu/people/jure/pubs/graphsage-nips17.pdf> 19 pages.

McCallum, et al., "A Comparison of Event Models for Naive Bayes Text Classification"; Learning for Text Categorization: Papers from the 1998 AAAI Workshop; 8 pages.

Mikolov, et al., "Efficient Estimation of Word Representations in Vector Space", arXiv:1301.3781v3 [cs.CL] (2013) 12 pages.

PCT, International Search Report and Written Opinion of the International Searching Authority for International Application No. PCT/US16/35186, dated Nov. 4, 2016; 23 pages.

Perozzi, et al., "DeepWalk: Online Learning of Social Representations" KDD'14 Aug. 24-27, 2014, New York, NY, ACM 978-1-4503-2956—Sep. 14, 2008; DOI 10.1145/2623330.2623732; 10 pages.

Snoek, et al., "Practical Bayesian Optimization of Machine Learning Algorithms"; dated Aug. 29, 2012; 12 pages.

Tang, et al., "LINE: Large-scale Information Network Embedding" WWW 2015, May 18-22, 2015, Florence, Italy. ACM 978-1-4503-3469—Mar. 15, 2005. DOI 10-1145/2736277.2741093; 11 pages.

Withers, "What is Buyer Intent Data? A Guide for 2020"; dated Apr. 1, 2020; retrieved from the Internet at <https://blog.zoominfo.com/how-to-use-internet-data/>; 6 pages.

ZoomInfo Launches Intent Solution for Marketing and Sales, dated Apr. 9, 2020; retrieved from the Internet at <https://destinationcrm.com/ . . . News/CRM-Across-the-Wire/ZoomInfo-Launches-Intent-Solution-for-Marketing-and-Sales-140221.aspx>; 2 pages.

ZoomInfo Launches 'Intent' Solution to Help B2B Companies Identify, Prioritize and Engage Sales Leads Based on Buying Signals dated Apr. 9, 2020; retrieved from the Internet at <https://www.businesswire.com/news/home/20200409005418/en/ZoomInfo-Launches-'Intent'-Solution_B2B_Comapnies-Identify>; 2 pages.

* cited by examiner

CONTENT CONSUMPTION MONITOR

CROSS-REFERENCE TO RELATED APPLICATIONS

This application is a continuation of U.S. application Ser. No. 15/900,208 filed on Feb. 20, 2018, which is a continuation of U.S. application Ser. No. 14/498,056 filed Sep. 26, 2014 (now U.S. Pat. No. 9,940,634), the entire contents of each of which are incorporated herein by reference in their entireties.

BACKGROUND

Users receive a random variety of different information from a random variety of different businesses. For example, users may constantly receive promotional announcements, advertisements, information notices, event notifications, etc. Users request some of this information. For example, a user may register on a company website to receive sales or information announcements. However, much of the information sent by the company is of little or no interest to the user. For example, the company may send the user emails announcing every upcoming seminar, regardless of the subject matter.

The user also may receive unsolicited information. For example, a user may register on a website to download a white paper on a particular subject. A lead service then sells the email address to companies that send the user unsolicited advertisements. Users end up ignoring most or all of these emails since most of the information has no relevance or interest. Alternatively, the user directs all of these emails into a junk email folder. In either event, sending these unsolicited advertisements to users results in large amounts of computing and network resources being wasted.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
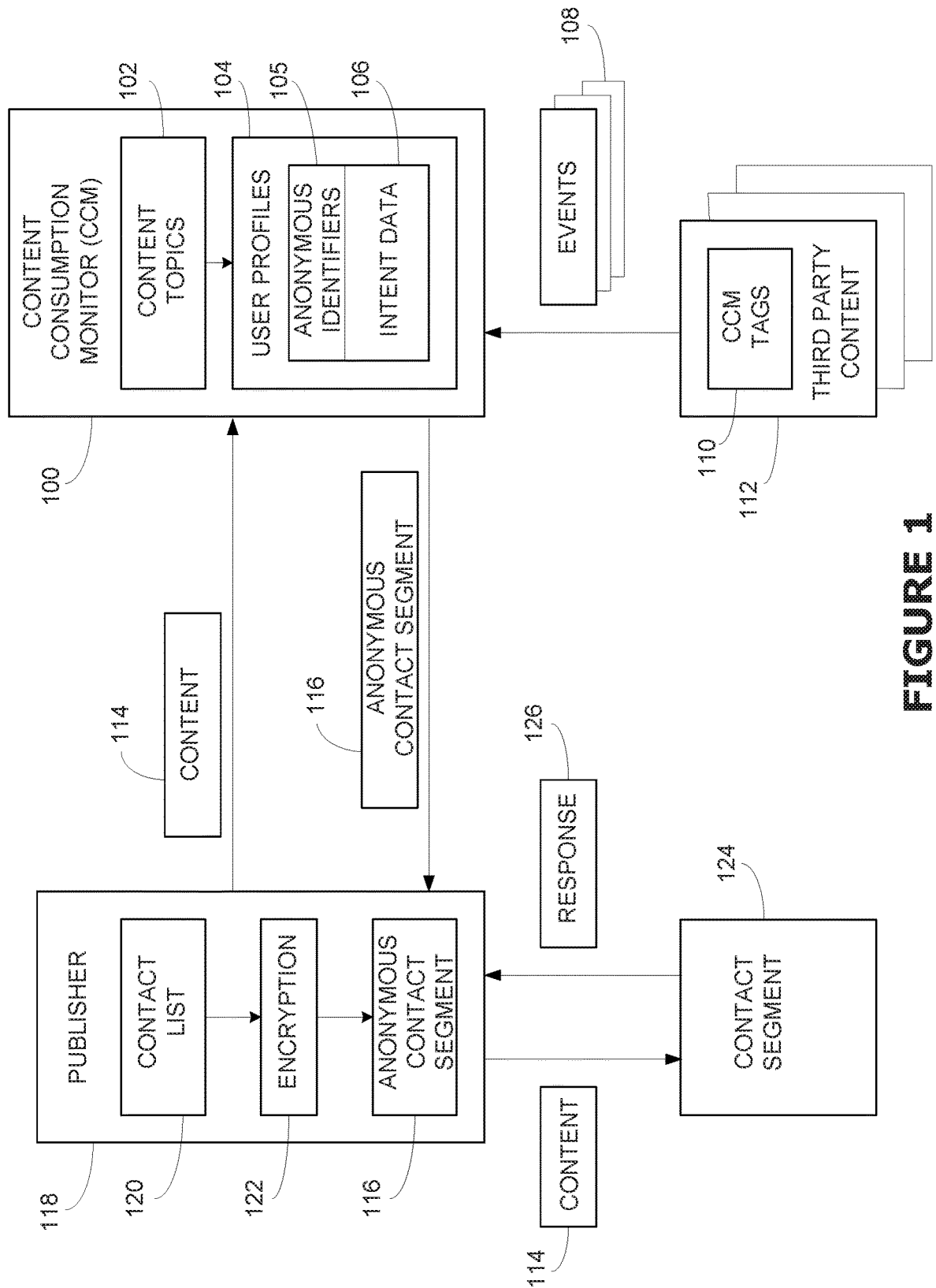
FIG. 1 depicts an example content consumption monitor (CCM) according to various embodiments.

Disclosed embodiments are related to a content consumption monitor (CCM) that generates intent data that identifies topics of real-time interest to users. The CCM uses the intent data to direct information to more interested audiences and reduce the information noise/overload that may prevent users from viewing on-line information. Publishers using the targeted intent data may increase conversion rates for seminars, advertising, documents downloads, or any other activity associated with published information. Publishers may also include advertisers, or any other entity using the segmentation information.

In one example, the CCM generates user profiles that identify user interests. The user interests are alternatively referred to as user intent. The user profiles better represent current user interests by using a wide variety of different third party content.

The CCM may weigh topics in the user profiles based on different online and offline user activities. For example, the CCM may apply higher weights for more assertive user activities, such as registering for seminars or downloading electronic documents. The CCM may apply lower weights to more passive user activities, such as viewing a web page. These weightings operate in an "actions speak louder than words" manner where the activities associated with accessing content may provide a truer indication of user interests.

The CCM can aggregate intent data for different categories, such as by company, job title, geographic location, etc. The CCM can further segment entities within the different categories.

For example, the CCM may identify companies interested in particular topics and direct content related to those topics to particular officers or persons within those companies.

In some embodiments, various machine learning (ML) techniques may be used to generate the user profiles such as, for example, classification algorithms or the like. Classification involves determining the classes to which various data points belong. Here, "classes" are categories, and are sometimes called "targets" or "labels." ML algorithms for classification may be referred to as a "classifier." Examples of classifiers include linear classifiers, k-nearest neighbor (kNN), logistic regression, decision trees, random forests, support vector machines (SVMs), Bayesian classifiers, convolutional neural networks (CNNs), among many others (note that some of these algorithms can be used for other ML tasks as well). Classification is used when the outputs are restricted to a limited set of quantifiable properties. These quantifiable properties are referred to as "features." In the context of ML, a feature is an individual measureable property or characteristic of a phenomenon being observed. Features are usually represented using numbers/numerals (e.g., integers), strings, variables, ordinals, real-values, categories, and/or the like. A set of features may be referred to as a "feature vector." A vector is a tuple of one or more values called scalars, and a feature vector may include a tuple of one or more features. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples.

The embodiments herein amount to an improvement in the technological fields of machine learning, topic classification and/or natural language processing (NLP) tasks, resource usage monitoring. The embodiments herein also amount to an improvement in the functioning of computing systems and computing networks themselves. Other embodiments may be described and/or claimed.

1. Content Consumption Monitor Embodiments

FIG. 1 depicts a content consumption monitor (CCM) 100. CCM 100 may be a server or any other computing system that communicates with a publisher 118 and monitors user accesses to third party content 112. Publisher 118 is any server or computer operated by a company or individual that wants to send content 114 to an interested group of users. This group of users is alternatively referred to as contact segment 124.

For example, publisher 118 may be a company that sells electric cars. Publisher 118 may have a contact list 120 of email addresses for customers that have attended prior seminars or have registered on the publisher website. Contact list 120 also may be generated by CCM tags 110 that are described in more detail below. Publisher 118 also may generate contact list 120 from lead lists provided by third parties lead services, retail outlets, and/or other promotions or points of sale, or the like or any combination thereof. Publisher may want to send email announcements for an upcoming electric car seminar. Publisher 118 would like to increase the number of attendees at the seminar.

The third party content 112 may include any type of information object (or collection of information objects). Information objects 112 may include electronic documents, database objects, electronic files, resources, and/or any data structure that includes one or more data items, each of which may include one or more data values. The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., mark-up language elements/tags, etc.). The terms "data item" or "information item" as used herein may also refer to data elements and/or content items, although these terms may refer to difference concepts. A data element (or simply "element") is a logical component of an information object (or electronic document) that begins with a start tag (e.g., "<element>") and ends with a matching end tag (e.g., "</element>"), or only an empty element tag (e.g., "<element/>"). Any characters between the start tag and end tag, if any, are the element's content (referred to herein as "content items" or the like). Content items may include text content (e.g., "<element>content item</element>"), attributes (e.g., "<element attribute="attributeValue">"), and other elements referred to as "child elements" (e.g., "<element1><element2>content item</element2></element1>"). An "attribute" may refer to a markup construct including a name-value pair that exists within a start tag or empty element tag. Attributes contain data related to its element and/or control the element's behavior.

In some implementations, the third party content 112 may include webpages provided on (or served) by one or more webservers operated by different service provides, businesses, and/or individuals. For example, third party content 112 may come from different websites operated by on-line retailers and wholesalers, on-line newspapers, universities, blogs, municipalities, social media sites, or any other entity that supplies content. Third party content 112 also may include information not accessed directly from websites. For example, users may access registration information at seminars, retail stores, and other events. Third party content 112 also may include content provided by publisher 118.

Computers and/or servers associated with publisher 118, content segment 124, CCM 100 and third party content 112 may communicate over the Internet or any other wired or wireless network including local area networks (LANs), wide area networks (WANs), wireless networks, cellular networks, WiFi networks, Personal Area Networks (e.g., Bluetooth® or the like), Digital Subscriber Line (DSL) and/or cable networks, and/or the like, and/or any combination thereof.

Some of third party content 112 contain CCM tags 110 that capture and send network session events 108 (or simply "events 108") to CCM 100. For example, CCM tags 110 may comprise JavaScript or other script/code added to webpages of a website, a mobile application (app), individual components of a web app, and/or the like. The website downloads the webpages, along with CCM tags 110, to user computers. User computers may include any communication and/or processing device. Examples of such user computers include, but are not limited to, laptop computers, personal (desktop) computers, workstations, smartphones, terminals, tablet computers, wearable devices, and/or the like, or any combination thereof. CCM tags 110 monitor network/web sessions and send some captured network/web session events 108 to CCM 100.

Events 108 may identify third party content 112 and identify the user accessing third party content 112. For example, event 108 may include a universal resource locator (URL) link to third party content 112 and may include an hashed user email address or cookie identifier associated with the user that accessed third party content 112. Event 108 also may identify an access activity associated with third party content 112. For example, event 108 may indicate the user viewed a web page, downloaded an electronic document, or registered for a seminar Other examples of events 108 include page views together with information on browser, referrer (application or webpage), platform, and the like; clicks (e.g., including information on each element that is clicked (e.g., id, title, data attributes, etc.)); engagements with elements in information objects (e.g., including the type of engagement (e.g., mouseover, scroll speed, taps/gestures, etc.) and information on the element (e.g., id, title, data attributes, etc.)); jumps (e.g., navigation inside a webpage or web app that results in a change to a URL); form interactions (e.g., including form abandonment and form submission events, and data included in the forms); redirects; page reloads or refreshes; and/or other like events.

CCM 100 builds user profiles 104 from events 108. Additionally or alternatively, data from other datasets may be used to build user profiles 104. For example, data about the websites or apps being used (or individual features/components of the websites/apps), the platform or hardware configuration of the user computer systems/devices, the type of information objects or third party content 112 being consumed, and/or the like. Furthermore, third party user interaction data, which may be the same or similar to the events 108 (or include the same or similar data as the events 108) discussed previously, may be used for creating user profiles 104. In various embodiments, other types of data that may be collected from various data sources may be used in addition to, or alternative to, the network session event data.

User profiles 104 may include anonymous identifiers 105 that associate third party content 112 with particular users. User profiles 104 also may include intent data 106 that identifies topics in third party content 112 accessed by the users. Intent data 106 may be a collection of behavioral signals that indicate interest or intent with respect to a topic or content. For example, intent data 106 may comprise a user intent vector (e.g., user intent vector 145, user intent vector 294, or the like) that identifies the topics and identifies levels of user interest in the topics. In some implementations, the user intent vector may be a ML feature vector or the like.

As mentioned above, publisher 118 may want to send an email announcing an electric car seminar to a particular contact segment 124 of users interested in electric cars. Publisher 118 sends the email as content 114 to CCM 100. CCM 100 identifies topics 102 in content 114. CCM 100 compares content topics 102 with intent data 106. CCM 100 identifies the user profiles 104 that indicate an interest in content 114. CCM 100 sends anonymous identifiers 105 for the identified user profiles 104 to publisher 118 as anonymous contact segment 116.

Contact list 120 may include user identifiers, such as email addresses, names, phone numbers, or the like, or any combination thereof. The identifiers in contact list 120 are hashed or otherwise de-identified by an algorithm 122. Publisher 118 compares the hashed identifiers from contact list 120 with the anonymous identifiers 105 in anonymous contact segment 116.

Any matching identifiers are identified as contact segment 124. Publisher 118 identifies the unencrypted email addresses in contact list 120 associated with contact segment 124. Publisher 118 sends content 114 to the email addresses identified for contact segment 124. For example, publisher 118 sends email announcing the electric car seminar to contact segment 124.

Sending content 114 to contact segment 124 may generate a substantial lift in the number of positive responses 126. For example, assume publisher 118 wants to send emails announcing early bird specials for the upcoming seminar. The seminar may include ten different tracks, such as electric cars, environmental issues, renewable energy, etc. In the past, publisher 118 may have sent ten different emails for each separate track to everyone in contact list 120.

Publisher 118 may now only send the email regarding the electric car track to contacts identified in contact segment 124. The number of positive responses 126 registering for the electric car track of the seminar may substantially increase since content 114 is now directed to users interested in electric cars.

In another example, CCM 100 may provide local ad campaign or email segmentation. For example, CCM 100 may provide a "yes" or "no" as to whether a particular advertisement should be shown to a particular user. In this example, CCM 100 may use the hashed data without re-identification of users and the "yes/no" action recommendation may key off of a de-identified hash value.

CCM 100 may revitalize cold contacts in publisher contact list 120. CCM 100 can identify the users in contact list 120 that are currently accessing other third party content 112 and identify the topics associated with third party content 112. By monitoring accesses to third party content 112, CCM 100 may identify current user interests even though those interests may not align with the content currently provided by publisher 118. Publisher 118 might reengage the cold contacts by providing content 114 more aligned with the most relevant topics identified in third party content 112.

Figure 2:
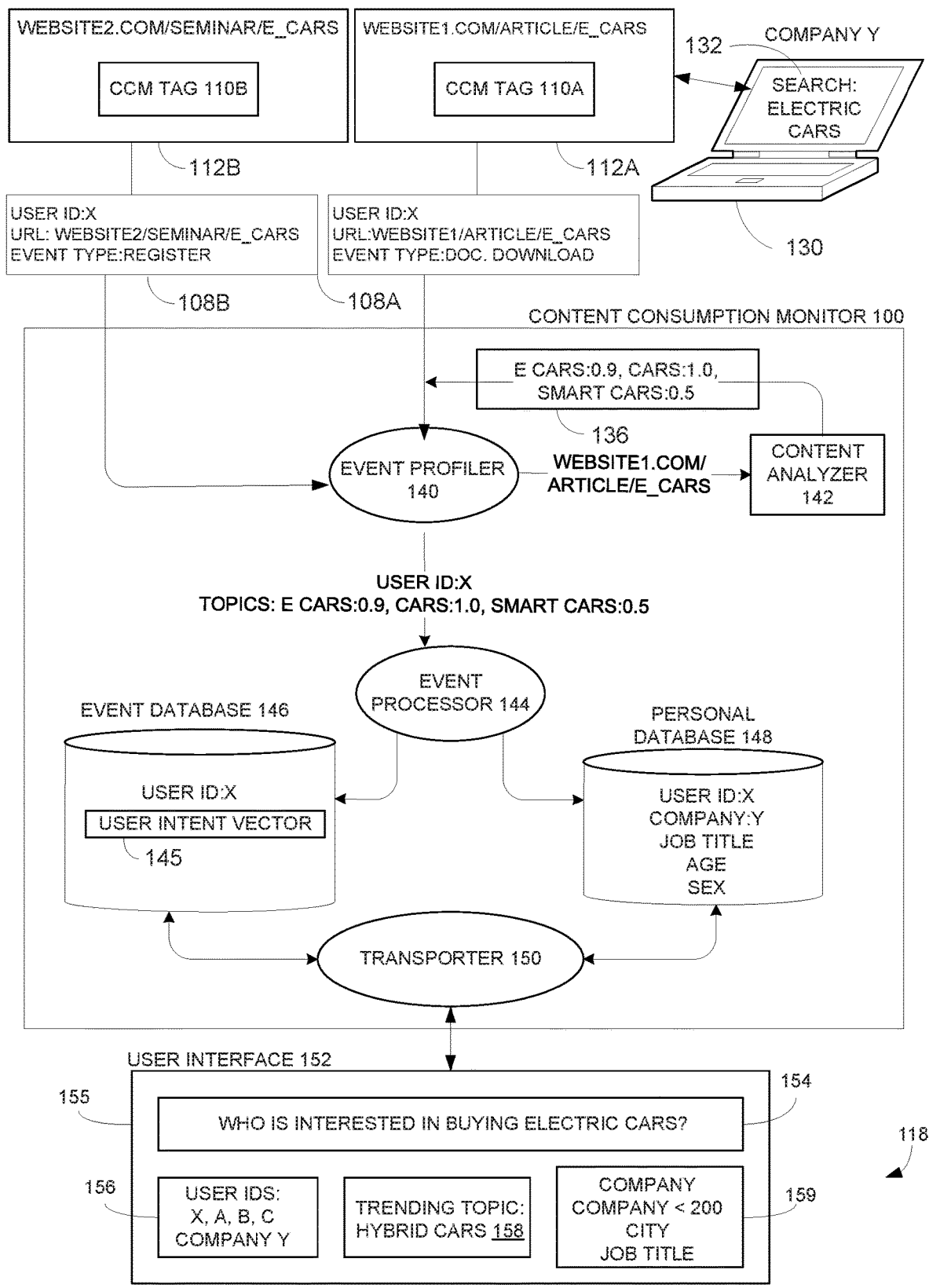
FIG. 2 depicts an example of the CCM in more detail according to various embodiments.

FIG. 2 is a diagram explaining the content consumption manager in more detail. A user may enter a search query 132 into a computer 130 via a search engine. The user may work for a company Y. For example, the user may have an associated email address USER@COMPANY_Y.com.

In response to search query 132, the search engine may display links to content 112A and 112B on website1 and website2, respectively. The user may click on the link to website1. Website1 may download a web page to computer 130 that includes a link to a white paper. Website1 may include one or more web pages with CCM tags 110A that capture different events during the web session between website1 and computer 130. Website1 or another website may have downloaded a cookie onto a web browser operating on computer 130. The cookie may comprise an identifier X, such as a unique alphanumeric set of characters associated with computer 130.

During the web session with website1, the user of computer 130 may click on a link to white paper 112A. In response to the mouse click, CCM tag 110A may download an event 108A to CCM 100. Event 108A may identify the cookie identifier X loaded on the web browser of computer 130. In addition or alternatively, CCM tag 110A may capture a user name and/or email address entered into one or more web page fields during the web session. CCM tag 110 hashes the email address and includes the hashed email address in event 108A. Any identifier associated with the user is referred to generally as user X or user ID.

CCM tag 110A may also include a link in event 108A to the white paper downloaded from website1 to computer 130. For example, CCM tag 110A may capture the universal resource locator (URL) for white paper 112A. CCM tag 110A also may include an event type identifier in event 108A that identifies an action or activity associated with content 112A. For example, CCM tag 110A may insert an event type identifier into event 108A that indicates the user downloaded an electric document.

CCM tag 110A also may identify the launching platform for accessing content 112B. For example, CCM tag 110B may identify a link www.searchengine.com to the search engine used for accessing website1.

An event profiler 140 in CCM 100 forwards the URL identified in event 108A to a content analyzer 142. Content analyzer 142 generates a set of topics 136 associated with or suggested by white paper 112A. For example, topics 136 may include electric cars, cars, smart cars, electric batteries, etc. Each topic 136 may have an associated relevancy score indicating the relevancy of the topic in white paper 112A. Content analyzers that identify topics in documents are known to those skilled in the art and are therefore not described in further detail.

Event profiler 140 forwards the user ID, topics 136, event type, and any other data from event 108A to event processor 144. Event processor 144 may store personal information captured in event 108A in a personal database 148. For example, during the web session with website1, the user may have entered an employer company name into a web page form field. CCM tag 110A may copy the employer company name into event 108A. Alternatively, CCM 100 may identify the company name from a domain name of the user email address.

Event processor 144 may store other demographic information from event 108A in personal database 148, such as user job title, age, sex, geographic location (postal address), etc. In one example, some of the information in personal database 148 is hashed, such as the user ID and or any other personally identifiable information. Other information in personal database 148 may be anonymous to any specific user, such as company name and job title.

Event processor 144 builds a user intent vector 145 from topic vectors 136. Event processor 144 continuously updates user intent vector 145 based on other received events 108. For example, the search engine may display a second link to website2 in response to search query 132. User X may click on the second link and website2 may download a web page to computer 130 announcing the seminar on electric cars.

The web page downloaded by website2 also may include a CCM tag 110B. User X may register for the seminar during the web session with website2. CCM tag 110B may generate a second event 108B that includes the user ID: X, a URL link to the web page announcing the seminar, and an event type indicating the user registered for the electric car seminar advertised on the web page.

CCM tag 110B sends event 108B to CCM 100. Content analyzer 142 generates a second set of topics 136. Event 108B may contain additional personal information associated with user X. Event processor 144 may add the additional personal information to personal database 148.

Event processor 144 updates user intent vector 145 based on the second set of topics 136 identified for event 108B. Event processor 144 may add new topics to user intent vector 145 or may change the relevancy scores for existing topics. For example, topics identified in both event 108A and 108B may be assigned higher relevancy scores. Event processor 144 also may adjust relevancy scores based on the associated event type identified in events 108.

Publisher 118 may submit a search query 154 to CCM 100 via a user interface 152 on a computer 155. For example, search query 154 may ask WHO IS INTERESTED IN BUYING ELECTRIC CARS? A transporter 150 in CCM 100 searches user intent vectors 145 for electric car topics with high relevancy scores. Transporter 150 may identify user intent vector 145 for user X. Transporter 150 identifies user X and other users A, B, and C interested in electric cars in search results 156.

As mentioned above, the user IDs may be hashed and CCM 100 may not know the actual identities of users X, A, B, and C. CCM 100 may provide a segment of hashed user IDs X, A, B, and C to publisher 118 in response to query 154.

Publisher 118 may have a contact list 120 of users (FIG. 1). Publisher 118 may hash email addresses in contact list 120 and compare the hashed identifiers with the encrypted or hashed user IDs X, A, B, and C. Publisher 118 identifies the unencrypted email address for matching user identifiers. Publisher 118 then sends information related to electric cars to the email addresses of the identified user segment. For example, publisher 118 may send emails containing white papers, advertisements, articles, announcements, seminar notifications, or the like, or any combination thereof.

CCM 100 may provide other information in response to search query 154. For example, event processor 144 may aggregate user intent vectors 145 for users employed by the same company Y into a company intent vector. The company intent vector for company Y may indicate a strong interest in electric cars. Accordingly, CCM 100 may identify company Y in search results 156. By aggregating user intent vectors 145, CCM 100 can identify the intent of a company or other category without disclosing any specific user personal information, e.g., without regarding a user's online browsing activity.

CCM 100 continuously receives events 108 for different third party content. Event processor 144 may aggregate events 108 for a particular time period, such as for a current day or for the past 30 days. Event processor 144 then may identify trending topics 158 within that particular time period. For example, event processor 144 may identify the topics with the highest average relevancy values over the last 30 days.

Different filters 159 may be applied to the intent data stored in event database 146. For example, filters 159 may direct event processor 144 to identify users in a particular company Y that are interested in electric cars. In another example, filters 159 may direct event processor 144 to identify companies with less than 200 employees that are interested in electric cars.

Filters 159 also may direct event processor 144 to identify users with a particular job title that are interested in electric cars or identify users in a particular city that are interested in electric cars. CCM 100 may use any demographic information in personal database 148 for filtering query 154.

CCM 100 monitors content accessed from multiple different third party websites. This allows CCM 100 to better identify the current intent for a wider variety of users, companies, or any other demographics. CCM 100 may use hashed and/or other anonymous identifiers to maintain user privacy. CCM 100 further maintains user anonymity by identifying the intent of generic user segments, such as companies, marketing groups, geographic locations, or any other user demographics.

Figure 3:
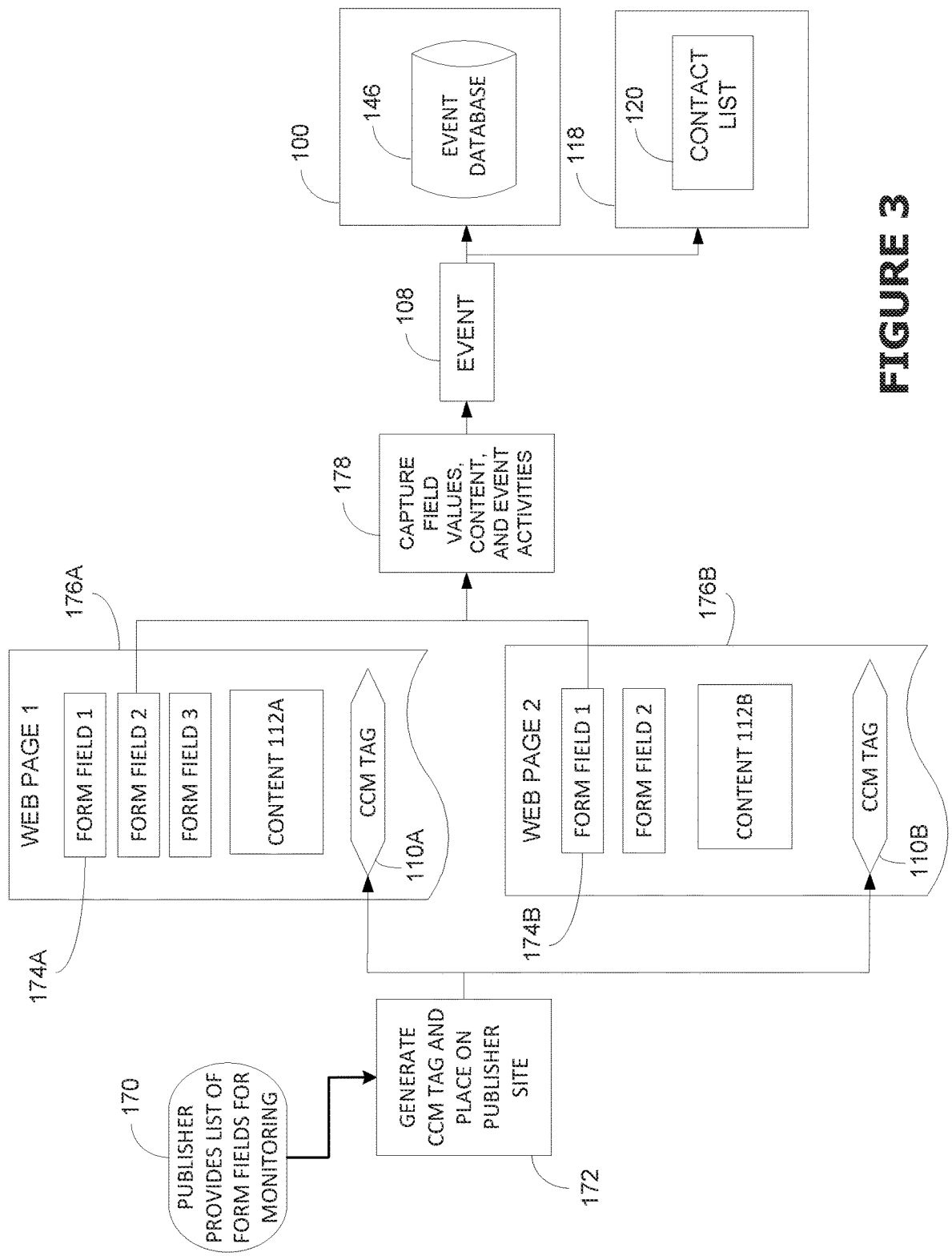
FIG. 3 depicts an example operation of a CCM tag according to various embodiments.

FIG. 3 depicts example operations performed by CCM tags. In operation 170, a publisher provides a list of form fields 174 for monitoring on web pages 176. In operation 172, CCM tags 110 are generated and loaded in web pages 176 on the publisher website. For example, CCM tag 110A is loaded onto a first web page 176A of the publisher website and a CCM tag 110B is loaded onto a second web page 176B of the publisher website. In one example, CCM tags 110 comprise JavaScript loaded into the web page document object model (DOM).

The publisher may download web pages 176, along with CCM tags 110, to user computers during web sessions. CCM tag 110A captures the data entered into some of form fields 174A and CCM tag 110B captures data entered into some of form fields 174B.

A user enters information into form fields 174A and 174B during the web session. For example, the user may enter an email address into one of form fields 174A during a user registration process. CCM tags 110 may capture the email address in operation 178, validate and hash the email address, and then send the hashed email address to CCM 100 in event 108.

CCM tags 100 may first confirm the email address includes a valid domain syntax and then use a hash algorithm to encode the valid email address string. CCM tags 110 also may capture other anonymous user identifiers, such as a cookie identifier. If no identifiers exist, CCM tag 110 may create a unique identifier.

CCM tags 110 may capture any information entered into fields 174. For example, CCM tags 110 also may capture user demographic data, such as company name, age, sex, postal address, etc. In one example, CCM tags 110 capture some the information for publisher contact list 120.

CCM tags 110 also may identify content 112 and associated event activities in operation 178. For example, CCM tag 110A may detect a user downloading a white paper 112A or registering for a seminar. CCM tag 110A captures the URL for white paper 112A and generates an event type identifier that identifies the event as a document download.

Depending on the application, CCM tag 110 in operation 178 sends the captured web session information in event 108 to publisher 118 or to CCM 100. For example, event 108 is sent to publisher 118 when CCM tag 110 is used for generating publisher contact list 120. Event 108 is sent to CCM 100 when CCM tag 110 is used for generating intent data.

CCM tags 110 may capture the web session information in response to the user leaving web page 176, existing one of form fields 174, selecting a submit icon, mousing out of one of form fields 174, a mouse click, an off focus, or any other user action. Note again that CCM 100 might never receive personally identifiable information (PII) since any PII data in event 108 is hashed by CCM tag 110.

Figure 4:
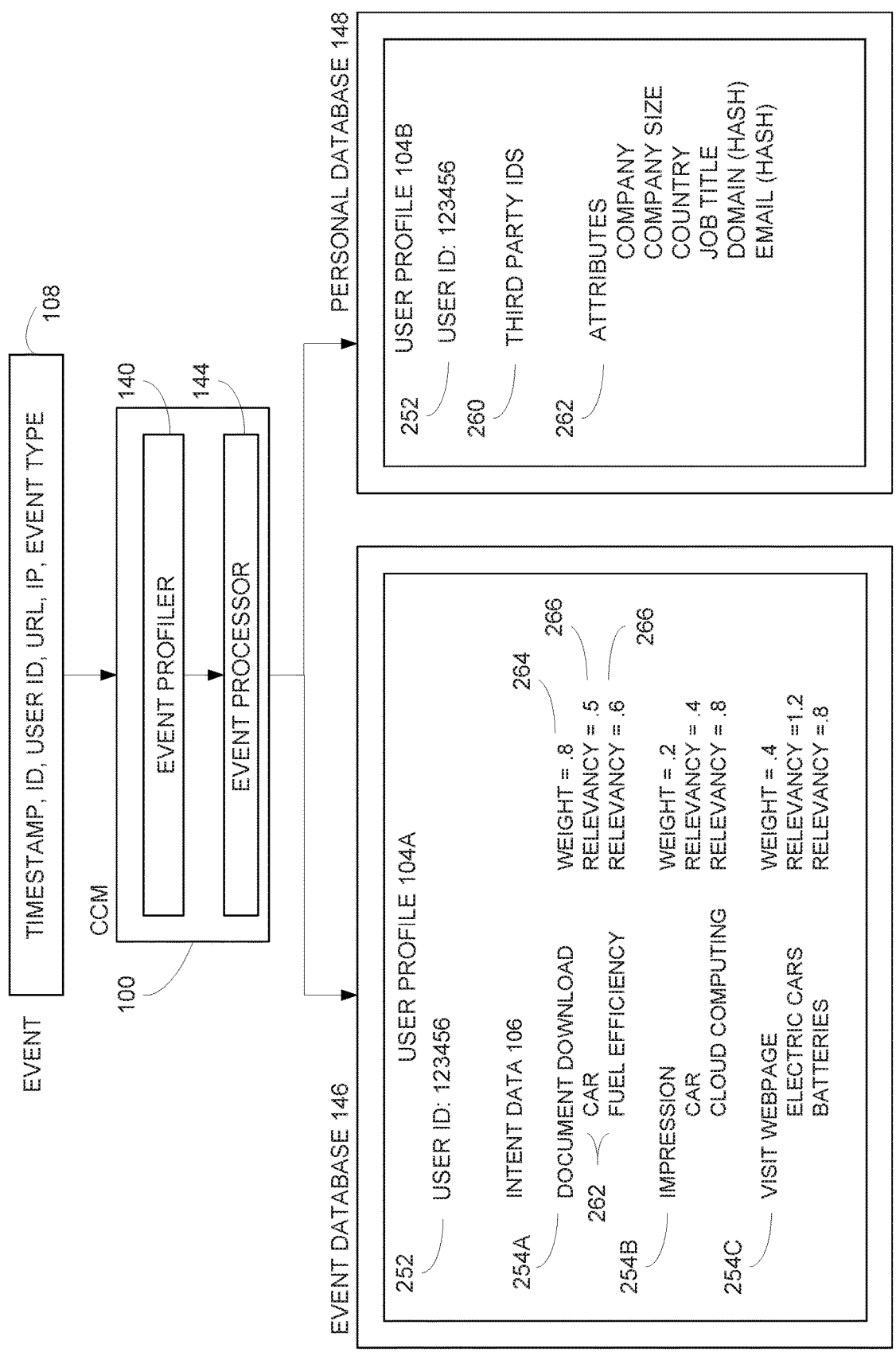
FIG. 4 depicts example events processed by the CCM according to various embodiments.

FIG. 4 is a diagram showing how the CCM generates intent data. A CCM tag may send a captured raw event 108 to CCM 100. For example, the CCM tag may send event 108 to CCM 100 in response to a user downloading a white paper. Event 108 may include a timestamp indicating when the white paper was downloaded, an identifier (ID) for event 108, a user ID associated with the user that downloaded the white paper, a URL for the downloaded white paper, and an IP address for the launching platform for the content. Event 108 also may include an event type indicating the user downloaded an electronic document.

Event profiler 140 and event processor 144 generate intent data 106 from one or more events 108. Intent data 106 may be stored in a structured query language (SQL) database or non-SQL database. In one example, intent data 106 is stored in user profile 104A and includes a user ID 252 and associated event data 254.

Event data 254A is associated with a user downloading a white paper. Event profiler 140 identifies a car topic 262 and a fuel efficiency topic 262 in the white paper. Event profiler 140 may assign a 0.5 relevancy value to the car topic and assign a 0.6 relevancy value to the fuel efficiency topic.

Event processor 144 may assign a weight value 264 to event data 254A. Event processor 144 may assign larger a weight value 264 to more assertive events, such as downloading the white paper. Event processor 144 may assign a smaller weight value 264 to less assertive events, such as viewing a web page. Event processor 144 may assign other weight values 264 for viewing or downloading different types of media, such as downloading a text, video, audio, electronic books, on-line magazines and newspapers, etc.

CCM 100 may receive a second event 108 for a second piece of content accessed by the same user. CCM 100 generates and stores event data 254B for the second event 108 in user profile 104A. Event profiler 140 may identify a first car topic with a relevancy value of 0.4 and identify a second cloud computing topic with a relevancy value of 0.8 for the content associated with event data 254B. Event processor 144 may assign a weight value of 0.2 to event data 254B.

CCM 100 may receive a third event 108 for a third piece of content accessed by the same user. CCM 100 generates and stores event data 254C for the third event 108 in user profile 104A. Event profiler 140 identifies a first topic associated with electric cars with a relevancy value of 1.2 and identifies a second topic associated with batteries with a relevancy value of 0.8. Event processor 144 may assign a weight value of 0.4 to event data 254C.

Event data 254 and associated weighting values 264 may provide a better indicator of user interests/intent. For example, a user may complete forms on a publisher website indicating an interest in cloud computing. However, CCM 100 may receive events 108 for third party content accessed by the same user. Events 108 may indicate the user downloaded a whitepaper discussing electric cars and registered for a seminar related to electric cars.

CCM 100 generates intent data 106 based on received events 108. Relevancy values 266 in combination with weighting values 264 may indicate the user is highly interested in electric cars. Even though the user indicated an interest in cloud computing on the publisher website, CCM 100 determined from the third party content that the user was actually more interested in electric cars.

CCM 100 may store other personal user information from events 108 in user profile 104B. For example, event processor 144 may store third party identifiers 260 and attributes 262 associated with user ID 252. Third party identifiers 260 may include user names or any other identifiers used by third parties for identifying user 252. Attributes 262 may include an employer company name, company size, country, job title, hashed domain name, and/or hashed email addresses associated with user ID 252. Attributes 262 may be combined from different events 108 received from different websites accessed by the user. CCM 100 also may obtain different demographic data in user profile 104 from third party data sources (whether sourced online or offline).

An aggregator may use user profile 104 to update and/or aggregate intent data for different segments, such as publisher contact lists, companies, job titles, etc. The aggregator also may create snapshots of intent data 106 for a selected time periods.

Event processor 144 may generate intent data 106 for both known and unknown users. For example, the user may access a web page and enter an email address into a form field in the web page. A CCM tag captures and hashes the email address and associates the hashed email address with user ID 252.

The user may not enter an email address into a form field. Alternatively, the CCM tag may capture an anonymous cookie ID in event 108. Event processor 144 then associates the cookie ID with user identifier 252. The user may clear the cookie or access data on a different computer. Event processor 144 may generate a different user identifier 252 and new intent data 106 for the same user.

The cookie ID may be used to create a de-identified cookie data set. The de-identified cookie data set then may be integrated with ad platforms or used for identifying destinations for target advertising.

CCM 100 may separately analyze intent data 106 for the different anonymous user IDs. If the user ever fills out a form providing an email address, event processor then may re-associate the different intent data 106 with the same user identifier 252.

Figure 5:
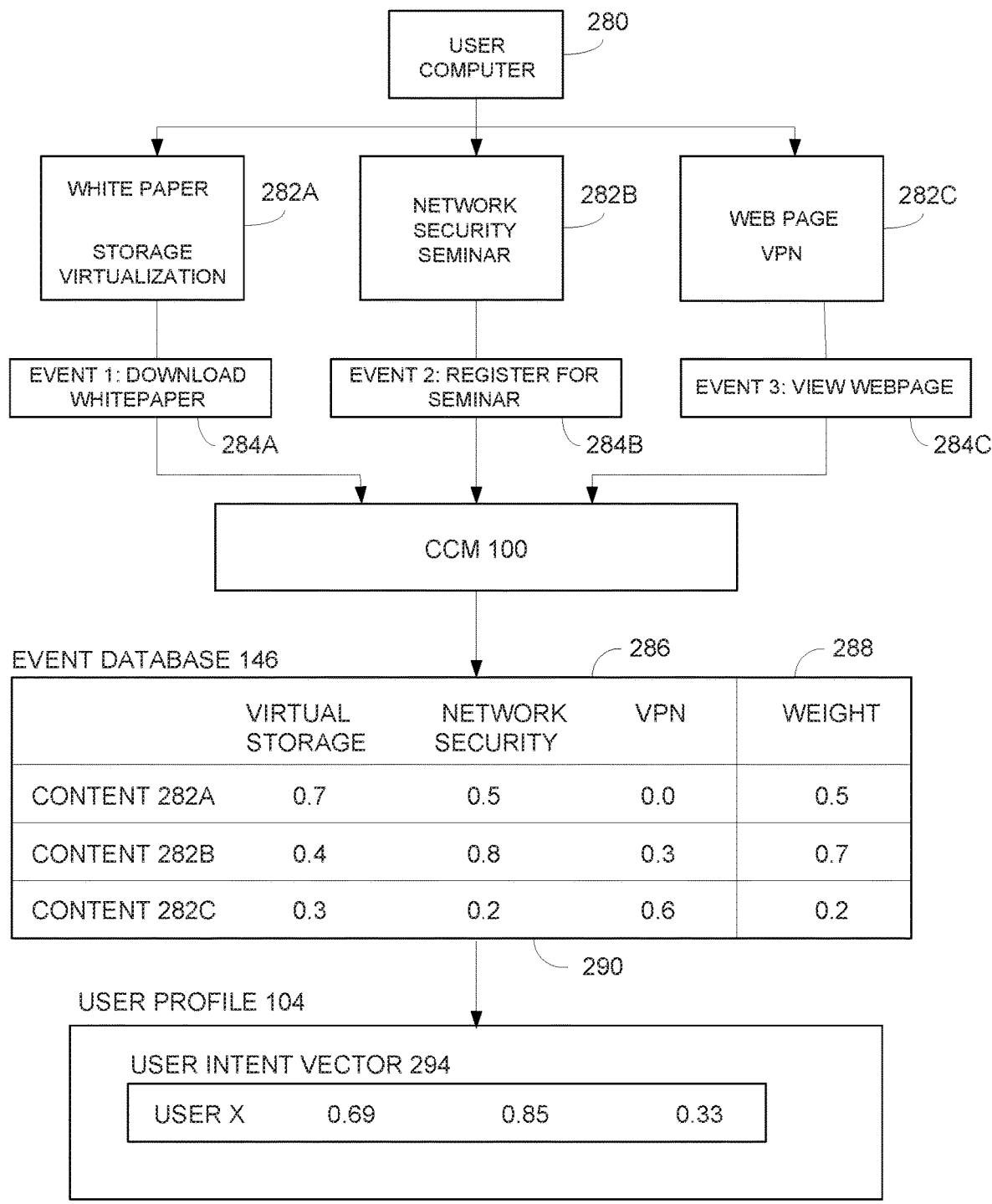
FIG. 5 depicts an example user intent vector according to various embodiments.

FIG. 5 depicts an example of how the CCM generates a user intent vector from the event data described above in FIG. 4. A user may use computer 280 to access different content 282. For example, the user may download a white paper 282A associated with storage virtualization, register for a network security seminar on a web page 282B, and view a web page article 282C related to virtual private networks (VPNs). Content 282A, 282B, and 282C may come from the same website or come from different websites.

The CCM tags discussed above capture three events 284A, 284B, and 284C associated with content 282A, 282B, and 282C, respectively. CCM 100 identifies topics 286 in content 282A, 282B, and/or 282C. Topics 286 include virtual storage, network security, and VPNs. CCM 100 assigns relevancy values 290 to topics 286 based on known algorithms. For example, relevancy values 290 may be assigned based on the number of times different associated keywords are identified in content 282.

CCM 100 assigns weight values 288 to content 282 based on the associated event activity. For example, CCM 100 assigns a relatively high weight value of 0.7 to a more assertive off-line activity, such as registering for the network security seminar. CCM 100 assigns a relatively low weight value of 0.2 to a more passive on-line activity, such as viewing the VPN web page.

CCM 100 generates a user intent vector 294 in user profile 104 based on the relevancy values 290. For example, CCM 100 may multiply relevancy values 290 by the associated weight values 288. CCM 100 then may sum together the weighted relevancy values for the same topics to generate user intent vector 294.

CCM 100 uses intent vector 294 to represent a user, represent content accessed by the user, represent user access activities associated with the content, and effectively represent the intent/interests of the user. In another embodiment, CCM 100 may assign each topic in user intent vector 294 a binary score of 1 or 0. CCM 100 may use other techniques for deriving user intent vector 294. For example, CCM 100 may weigh the relevancy values based on timestamps.

Figure 6:
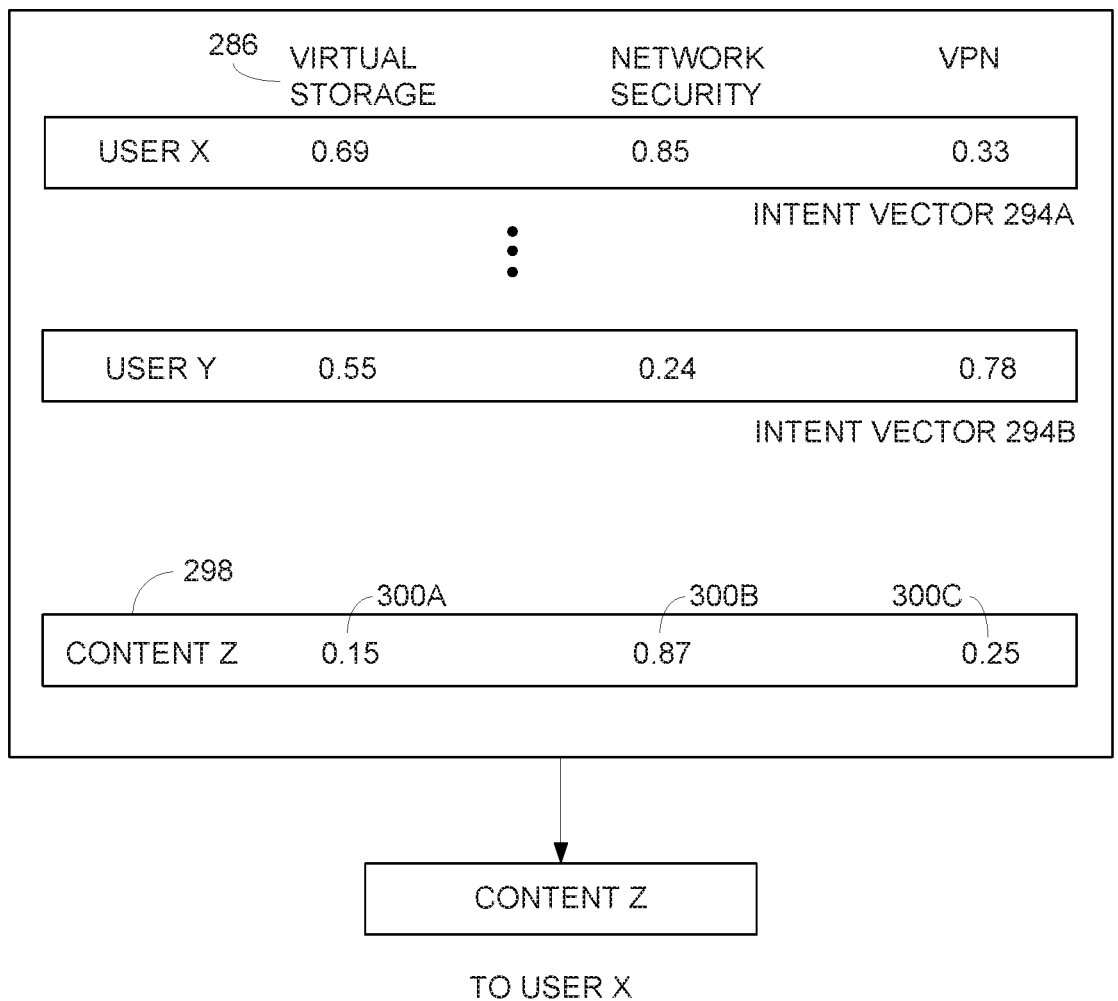
FIG. 6 depicts an example process for segmenting users according to various embodiments.

FIG. 6 depicts an example of how the CCM segments users. CCM 100 may generate user intent vectors 294A and 294B for two different users. A publisher may want to email content 298 to a segment of interested users. The publisher submits content 298 to CCM 100. CCM 100 identifies topics 286 and associated relevancy values 300 for content 298.

CCM 100 may use any variety of different algorithms to identify a segment of user intent vectors 294 associated with content 298. For example, relevancy value 300B indicates content 298 is primarily related to network security. CCM 100 may identify any user intent vectors 294 that include a network security topic with a relevancy value above a given threshold value.

In this example, assume the relevancy value threshold for the network security topic is 0.5. CCM 100 identifies user intent vector 294A as part of the segment of users satisfying the threshold value. Accordingly, CCM 100 sends the publisher of content 298 a contact segment that includes the user ID associated with user intent vector 294A. As mentioned above, the user ID may be a hashed email address, cookie ID, or some other encrypted or unencrypted identifier associated with the user.

In another example, CCM 100 calculates vector cross products between user intent vectors 294 and content 298. Any user intent vectors 294 that generate a cross product value above a given threshold value are identified by CCM 100 and sent to the publisher.

Figure 7:
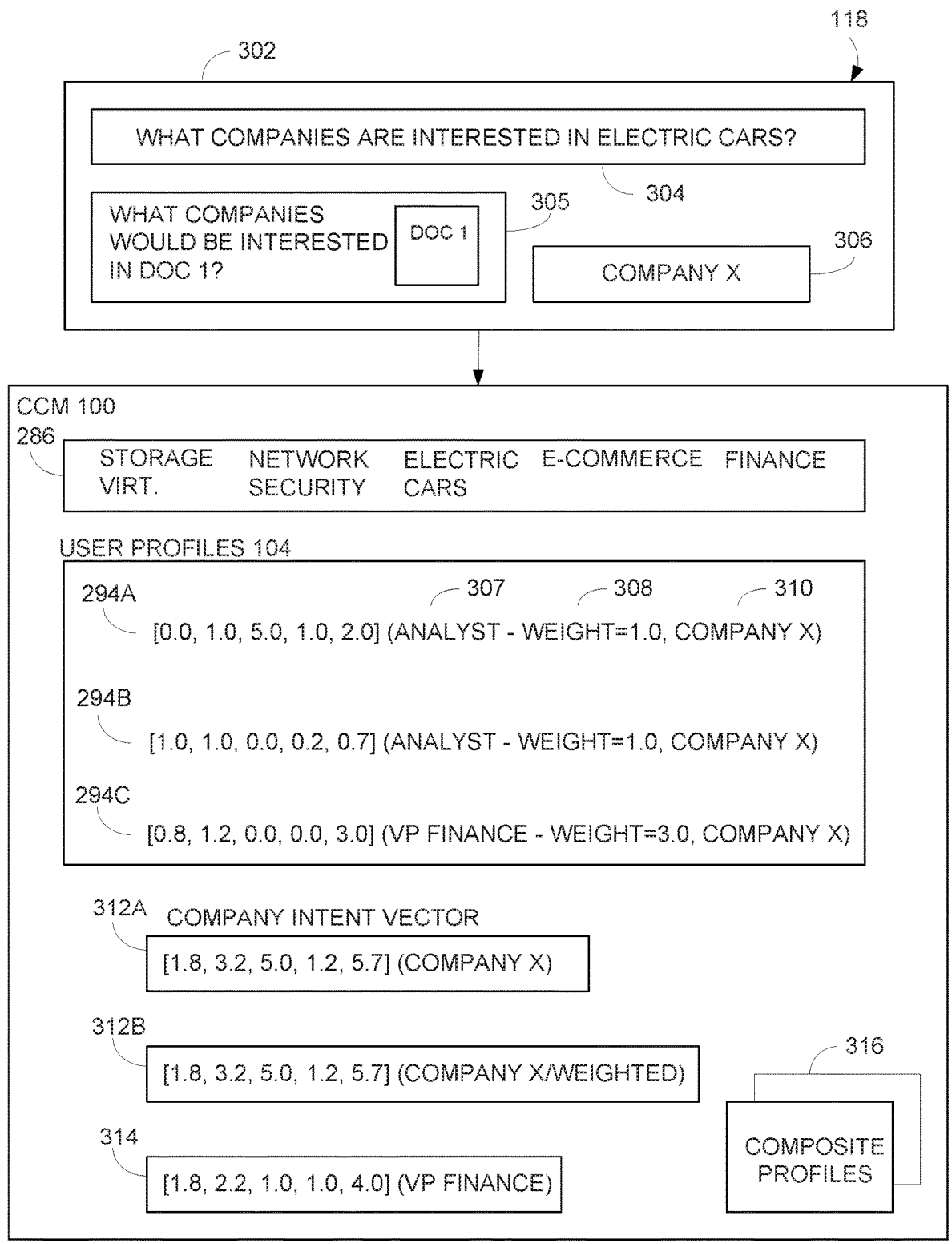
FIG. 7 depicts an example process for generating company intent vectors according to various embodiments.

FIG. 7 depicts examples of how the CCM aggregates intent data. In this example, a publisher operating a computer 302 submits a search query 304 to CCM 100 asking what companies are interested in electric cars. In this example, CCM 100 associates five different topics 286 with user profiles 104. Topics 286 include storage virtualization, network security, electric cars, e-commerce, and finance.

CCM 100 generates user intent vectors 294 as described above in FIG. 6. User intent vectors 294 have associated personal information, such as a job title 307 and an employer company name 310. As explained above, users may provide personal information, such as employer name and job title in form fields when accessing a publisher or third party website.

The CCM tags described above capture and send the job title and employer name information to CCM 100. CCM 100 stores the job title and employer information in the associated user profile 104.

CCM 100 searches user profiles 104 and identifies three user intent vectors 294A, 294B, and 294C associated with the same employer name 310. CCM 100 determines that user intent vectors 294A and 294B are associated with a same job title of analyst and user intent vector 294C is associated with a job title of VP of finance.

In response to, or prior to, search query 304, CCM 100 generates a company intent vector 312A for company X. CCM 100 may generate company intent vector 312A by summing up the topic relevancy values for all of the user intent vectors 294 associated with company X.

In response to search query 304, CCM 100 identifies any company intent vectors 312 that include an electric car topic 286 with a relevancy value greater than a given threshold. For example, CCM 100 may identify any companies with relevancy values greater than 4.0. In this example, CCM 100 identifies company X in search results 306.

In one example, intent is identified for a company at a particular zip code, such as zip code 11201. CCM 100 may take customer supplied offline data, such as from a Customer Relationship Management (CRM) database, and identify the users that match the company and zip code 11201 to create a segment.

In another example, publisher 118 may enter a query 305 asking which companies are interested in a document (DOC 1) related to electric cars. Computer 302 submits query 305 and DOC 1 to CCM 100. CCM 100 generates a topic vector for DOC 1 and compares the DOC 1 topic vector with all known company intent vectors 312A.

CCM 100 may identify an electric car topic in the DOC 1 with high relevancy value and identify company intent vectors 312 with an electric car relevancy value above a given threshold. In another example, CCM 100 may perform a vector cross product between the DOC 1 topics and different company intent vectors 312. CCM 100 may identify the names of any companies with vector cross product values above a given threshold value and display the identified company names in search results 306.

CCM 100 may assign weight values 308 for different job titles. For example, an analyst may be assigned a weight value of 1.0 and a vice president (VP) may be assigned a weight value of 3.0. Weight values 308 may reflect purchasing authority associated with job titles 307. For example, a VP of finance may have higher authority for purchasing electric cars than an analyst. Weight values 308 may vary based on the relevance of the job title to the particular topic. For example, CCM 100 may assign an analyst a higher weight value 308 for research topics.

CCM 100 may generate a weighted company intent vector 312B based on weighting values 308. For example, CCM 100 may multiply the relevancy values for user intent vectors 294A and 294B by weighting value 1.0 and multiply the relevancy values for user intent vector 294C by weighting value 3.0. The weighted topic relevancy values for user intent vectors 294A, 294B, and 294C are then summed together to generate weighted company intent vector 312B.

CCM 100 may aggregate together intent vectors for other categories, such as job title. For example, CCM 100 may aggregate together all the user intent vectors 294 with VP of finance job titles into a VP of finance intent vector 314. Intent vector 314 identifies the topics of interest to VPs of finance.

CCM 100 also may perform searches based on job title or any other category. For example, publisher 118 may enter a query LIST VPs OF FINANCE INTERESTED IN ELECTRIC CARS?

The CCM 100 identifies all of the user intent vectors 294 with associated VP finance job titles 307. CCM 100 then segments the group of user intent vectors 294 with electric car topic relevancy values above a given threshold value.

CCM 100 may generate composite profiles 316. Composite profiles 316 may contain specific information provided by a particular publisher or entity. For example, a first publisher may identify a user as VP of finance and a second publisher may identify the same user as VP of engineering.

Composite profiles 316 may include other publisher provided information, such as company size, company location, company domain.

CCM 100 may use a first composite profile 316 when providing user segmentation for the first publisher. The first composite profile 316 may identify the user job title as VP of finance. CCM 100 may use a second composite profile 316 when providing user segmentation for the second publisher. The second composite profile 316 may identify the job title for the same user as VP of engineering. Composite profiles 316 are used in conjunction with user profiles 104 derived from other third party content.

In yet another example, CCM 100 may segment users based on event type. For example, CCM 100 may identify all the users that downloaded a particular article, or identify all of the users from a particular company that registered for a particular seminar.

2. Example Hardware and Software Configurations and Implementations

Figure 8:
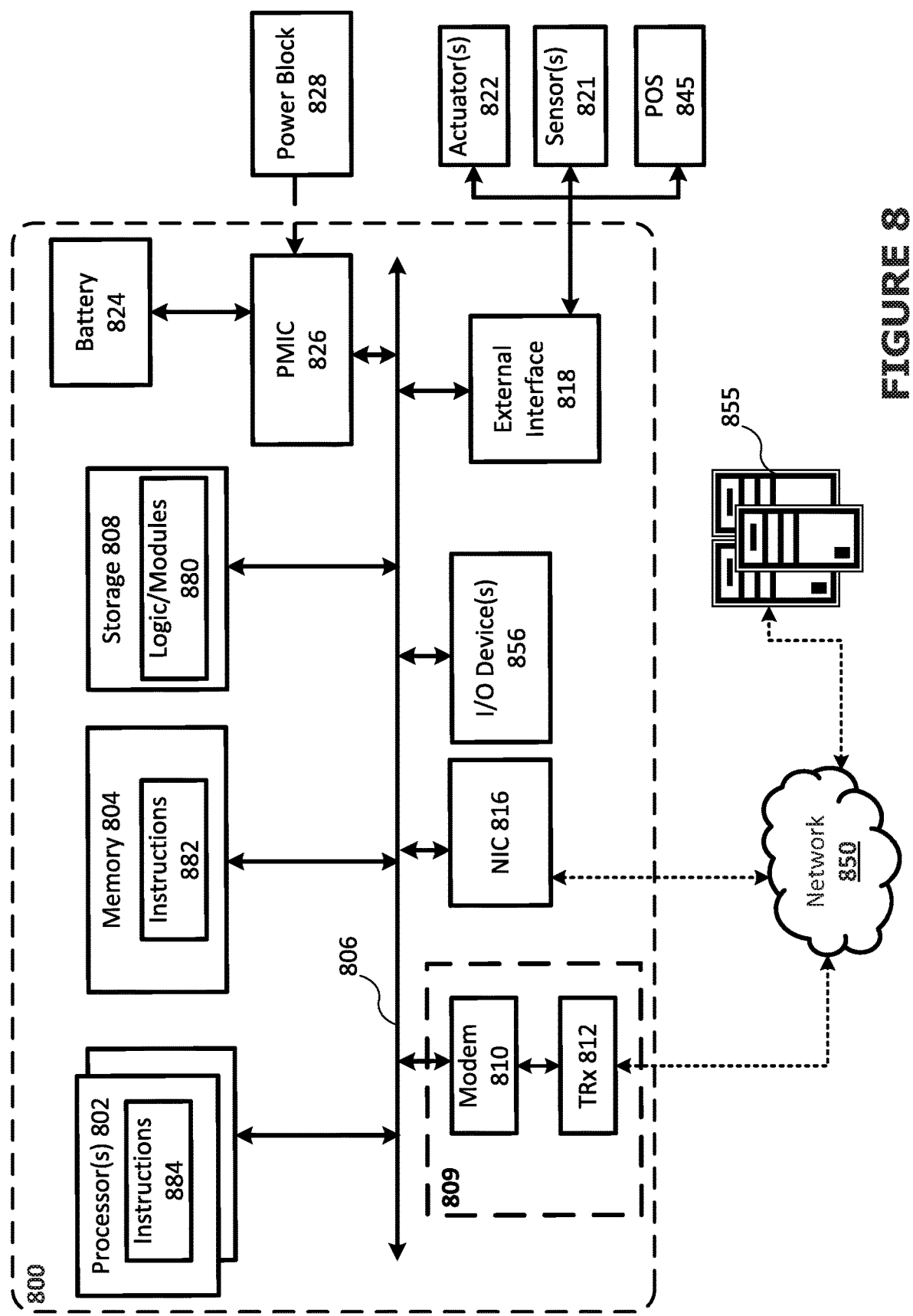
FIG. 8 depicts an example computing system suitable for practicing various aspects of the various embodiments discussed herein.

FIG. 8 illustrates an example of an computing system 800 (also referred to as "computing device 800," "platform 800," "device 800," "appliance 800," "server 800," or the like) in accordance with various embodiments. The computing system 800 may be suitable for use as any of the computer devices discussed herein and performing any combination of processes discussed above. As examples, the computing device 800 may operate in the capacity of a server or a client machine in a server-client network environment, or as a peer machine in a peer-to-peer (or distributed) network environment. Additionally or alternatively, the system 800 may represent the CCM 100, computer 130, user computer(s) 280, application server(s), a third party platform or collection of servers that hosts and/or serves third party content 112, and/or any other system or device discussed previously. Additionally or alternatively, various combinations of the components depicted by FIG. 8 may be included depending on the particular system/device that system 800 represents. For example, when system 800 represents a user or client device, the system 800 may include some or all of the components shown by FIG. 8. In another example, when the system 800 represents the CCM 100 or a server computer system, the system 800 may not include the communication circuitry 809 or battery 824, and instead may include multiple NICs 816 or the like. As examples, the system 800 and/or the remote system 855 may comprise desktop computers, workstations, laptop computers, mobile cellular phones (e.g., "smartphones"), tablet computers, portable media players, wearable computing devices, server computer systems, web appliances, network appliances, an aggregation of computing resources (e.g., in a cloud-based environment), or some other computing devices capable of interfacing directly or indirectly with network 850 or other network, and/or any other machine or device capable of executing instructions (sequential or otherwise) that specify actions to be taken by that machine.

The components of system 800 may be implemented as an individual computer system, or as components otherwise incorporated within a chassis of a larger system. The components of system 800 may be implemented as integrated circuits (ICs) or other discrete electronic devices, with the appropriate logic, software, firmware, or a combination thereof, adapted in the computer system 800. Additionally or alternatively, some of the components of system 800 may be combined and implemented as a suitable System-on-Chip (SoC), System-in-Package (SiP), multi-chip package (MCP), or the like.

The system 800 includes physical hardware devices and software components capable of providing and/or accessing content and/or services to/from the remote system 855. The system 800 and/or the remote system 855 can be implemented as any suitable computing system or other data processing apparatus usable to access and/or provide content/services from/to one another. The remote system 855 may have a same or similar configuration and/or the same or similar components as system 800. The system 800 communicates with remote systems 855, and vice versa, to obtain/serve content/services using, for example, Hypertext Transfer Protocol (HTTP) over Transmission Control Protocol (TCP)/Internet Protocol (IP), or one or more other common Internet protocols such as File Transfer Protocol (FTP); Session Initiation Protocol (SIP) with Session Description Protocol (SDP), Real-time Transport Protocol (RTP), or Real-time Streaming Protocol (RTSP); Secure Shell (SSH), Extensible Messaging and Presence Protocol (XMPP); WebSocket; and/or some other communication protocol, such as those discussed herein.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HTML documents; audio files such as MPEG-4 audio files and WebM audio and/or video files; etc.). As used herein, the term "service" refers to a particular functionality or a set of functions to be performed on behalf of a requesting party, such as the system 800. As examples, a service may include or involve the retrieval of specified information or the execution of a set of operations. In order to access the content/services, the system 800 includes components such as processors, memory devices, communication interfaces, and the like. However, the terms "content" and "service" may be used interchangeably throughout the present disclosure even though these terms refer to different concepts.

Referring now to system 800, the system 800 includes processor circuitry 802, which is configurable or operable to execute program code, and/or sequentially and automatically carry out a sequence of arithmetic or logical operations; record, store, and/or transfer digital data. The processor circuitry 802 includes circuitry such as, but not limited to one or more processor cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 802 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein. Individual processors (or individual processor cores) of the processor circuitry 802 may be coupled with or may include memory/storage and may be configurable or operable to execute instructions stored in the memory/storage to enable various applications or operating systems to run on the system 800. In these embodiments, the processors (or cores) of the processor circuitry 802 are configurable or operable to operate application software (e.g., logic/modules 880) to provide specific services to a user of the system 800. In some embodiments, the processor circuitry 802 may include special-purpose processor/controller to operate according to the various embodiments herein.

In various implementations, the processor(s) of processor circuitry 802 may include, for example, one or more processor cores (CPUs), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), SoCs and/or programmable SoCs, microprocessors or controllers, or any suitable combination thereof. As examples, the processor circuitry 802 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A, S, W, and T series processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X®, Tesla®, Shield®, and/or other like GPUs provided by Nvidia®; or the like. Other examples of the processor circuitry 802 may be mentioned elsewhere in the present disclosure.

In some implementations, the processor(s) of processor circuitry 802 may be, or may include, one or more media processors comprising microprocessor-based SoC(s), FPGA(s), or DSP(s) specifically designed to deal with digital streaming data in real-time, which may include encoder/decoder circuitry to compress/decompress (or encode and decode) Advanced Video Coding (AVC) (also known as H.264 and MPEG-4) digital data, High Efficiency Video Coding (HEVC) (also known as H.265 and MPEG-H part 2) digital data, and/or the like.

In some implementations, the processor circuitry 802 may include one or more hardware accelerators. The hardware accelerators may be microprocessors, configurable hardware (e.g., FPGAs, programmable ASICs, programmable SoCs, DSPs, etc.), or some other suitable special-purpose processing device tailored to perform one or more specific tasks or workloads, for example, specific tasks or workloads of the subsystems of the CCM 100, IP2D resolution system 850, and/or some other system/device discussed herein, which may be more efficient than using general-purpose processor cores. In some embodiments, the specific tasks or workloads may be offloaded from one or more processors of the processor circuitry 802. In these implementations, the circuitry of processor circuitry 802 may comprise logic blocks or logic fabric including and other interconnected resources that may be programmed to perform various functions, such as the procedures, methods, functions, etc. of the various embodiments discussed herein. Additionally, the processor circuitry 802 may include memory cells (e.g., EPROM, EEPROM, flash memory, static memory (e.g., SRAM, antifuses, etc.) used to store logic blocks, logic fabric, data, etc. in LUTs and the like.

In some implementations, the processor circuitry 802 may include hardware elements specifically tailored for machine learning functionality, such as for operating the subsystems of the CCM 100 discussed previously with regard to FIG. 2. In these implementations, the processor circuitry 802 may be, or may include, an AI engine chip that can run many different kinds of AI instruction sets once loaded with the appropriate weightings and training code. Additionally or alternatively, the processor circuitry 802 may be, or may include, AI accelerator(s), which may be one or more of the aforementioned hardware accelerators designed for hardware acceleration of AI applications, such as one or more of the subsystems of CCM 100, and/or some other system/device discussed herein. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 802 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

In some implementations, the processor(s) of processor circuitry 802 may be, or may include, one or more custom-designed silicon cores specifically designed to operate corresponding subsystems of the CCM 100, and/or some other system/device discussed herein. These cores may be designed as synthesizable cores comprising hardware description language logic (e.g., register transfer logic, verilog, Very High Speed Integrated Circuit hardware description language (VHDL), etc.); netlist cores comprising gate-level description of electronic components and connections and/or process-specific very-large-scale integration (VLSI) layout; and/or analog or digital logic in transistor-layout format. In these implementations, one or more of the subsystems of the CCM 100, and/or some other system/device discussed herein may be operated, at least in part, on custom-designed silicon core(s). These "hardware-ized" subsystems may be integrated into a larger chipset but may be more efficient that using general purpose processor cores.

The system memory circuitry 804 comprises any number of memory devices arranged to provide primary storage from which the processor circuitry 802 continuously reads instructions 882 stored therein for execution. In some embodiments, the memory circuitry 804 is on-die memory or registers associated with the processor circuitry 802. As examples, the memory circuitry 804 may include volatile memory such as random access memory (RAM), dynamic RAM (DRAM), synchronous DRAM (SDRAM), etc. The memory circuitry 804 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 804 may also comprise persistent storage devices, which may be temporal and/or persistent storage of any type, including, but not limited to, non-volatile memory, optical, magnetic, and/or solid state mass storage, and so forth.

In some implementations, some aspects (or devices) of memory circuitry 804 and storage circuitry 808 may be integrated together with a processing device 802, for example RAM or FLASH memory disposed within an integrated circuit microprocessor or the like. In other implementations, the memory circuitry 804 and/or storage circuitry 808 may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

Storage circuitry 808 is arranged to provide persistent storage of information such as data, applications, operating systems (OS), and so forth. As examples, the storage circuitry 808 may be implemented as hard disk drive (HDD), a micro HDD, a solid-state disk drive (SSDD), flash memory cards (e.g., SD cards, microSD cards, xD picture cards, and the like), USB flash drives, on-die memory or registers associated with the processor circuitry 802, resistance change memories, phase change memories, holographic memories, or chemical memories, and the like.

The storage circuitry 808 is configurable or operable to store computational logic 880 (or "modules 880") in the form of software, firmware, microcode, or hardware-level instructions to implement the techniques described herein. The computational logic 880 may be employed to store working copies and/or permanent copies of programming instructions, or data to create the programming instructions, for the operation of various components of system 800 (e.g., drivers, libraries, application programming interfaces (APIs), etc.), an OS of system 800, one or more applications, and/or for carrying out the embodiments discussed herein. The computational logic 880 may be stored or loaded into memory circuitry 804 as instructions 882, or data to create the instructions 882, which are then accessed for execution by the processor circuitry 802 to carry out the functions described herein. The processor circuitry 802 accesses the memory circuitry 804 and/or the storage circuitry 808 over the interconnect (IX) 806. The instructions 882 to direct the processor circuitry 802 to perform a specific sequence or flow of actions, for example, as described with respect to flowchart(s) and block diagram(s) of operations and functionality depicted previously. The various elements may be implemented by assembler instructions supported by processor circuitry 802 or high-level languages that may be compiled into instructions 884, or data to create the instructions 884, to be executed by the processor circuitry 802. The permanent copy of the programming instructions may be placed into persistent storage devices of storage circuitry 808 in the factory or in the field through, for example, a distribution medium (not shown), through a communication interface (e.g., from a distribution server (not shown)), or over-the-air (OTA).

The operating system (OS) of system 800 may be a general purpose OS or an OS specifically written for and tailored to the computing system 800. For example, when the system 800 is a server system or a desktop or laptop system 800, the OS may be Unix or a Unix-like OS such as Linux e.g., provided by Red Hat Enterprise, Windows 10™ provided by Microsoft Corp.®, macOS provided by Apple Inc.®, or the like. In another example where the system 800 is a mobile device, the OS may be a mobile OS, such as Android® provided by Google iOS® provided by Apple Inc.®, Windows 10 Mobile® provided by Microsoft Corp.®, KaiOS provided by KaiOS Technologies Inc., or the like.

The OS manages computer hardware and software resources, and provides common services for various applications (e.g., application 110). The OS may include one or more drivers or APIs that operate to control particular devices that are embedded in the system 800, attached to the system 800, or otherwise communicatively coupled with the system 800. The drivers may include individual drivers allowing other components of the system 800 to interact or control various I/O devices that may be present within, or connected to, the system 800. For example, the drivers may include a display driver to control and allow access to a display device, a touchscreen driver to control and allow access to a touchscreen interface of the system 800, sensor drivers to obtain sensor readings of sensor circuitry 821 and control and allow access to sensor circuitry 821, actuator drivers to obtain actuator positions of the actuators 822 and/or control and allow access to the actuators 822, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 800, such as the various subsystems of the CCM 100, and/or some other system/device discussed previously.

The components of system 800 communicate with one another over the interconnect (IX) 806. The IX 806 may include any number of IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system interconnects, Ethernet, Cache Coherent Interconnect for Accelerators (CCIA), Gen-Z Consortium IXs, Open Coherent Accelerator Processor Interface (OpenCAPI), and/or any number of other IX technologies. The IX 806 may be a proprietary bus, for example, used in a SoC based system.

The communication circuitry 809 is a hardware element, or collection of hardware elements, used to communicate over one or more networks (e.g., network 850) and/or with other devices. The communication circuitry 809 includes modem 810 and transceiver circuitry ("TRx") 812. The modem 810 includes one or more processing devices (e.g., baseband processors) to carry out various protocol and radio control functions. Modem 810 may interface with application circuitry of system 800 (e.g., a combination of processor circuitry 802 and CRM 860) for generation and processing of baseband signals and for controlling operations of the TRx 812. The modem 810 may handle various radio control functions that enable communication with one or more radio networks via the TRx 812 according to one or more wireless communication protocols. The modem 810 may include circuitry such as, but not limited to, one or more single-core or multi-core processors (e.g., one or more baseband processors) or control logic to process baseband signals received from a receive signal path of the TRx 812, and to generate baseband signals to be provided to the TRx 812 via a transmit signal path. In various embodiments, the modem 810 may implement a real-time OS (RTOS) to manage resources of the modem 810, schedule tasks, etc.

The communication circuitry 809 also includes TRx 812 to enable communication with wireless networks using modulated electromagnetic radiation through a non-solid medium. TRx 812 includes a receive signal path, which comprises circuitry to convert analog RF signals (e.g., an existing or received modulated waveform) into digital baseband signals to be provided to the modem 810. The TRx 812 also includes a transmit signal path, which comprises circuitry configurable or operable to convert digital baseband signals provided by the modem 810 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 812 using metal transmission lines or the like.

The TRx 812 may include one or more radios that are compatible with, and/or may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 8 (3rd Generation Partnership Project Release 8), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, I600.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), LoRaWAN™ (Long Range Wide Area Network), Sigfox, Wireless Gigabit Alliance (WiGig) standard, mmWave standards in general (wireless systems operating at 10-300 GHz and above such as WiGig, IEEE 802.11ad, IEEE 802.1 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the TRx 812 including, for example, radios compliant with standards issued by the ITU (International Telecommunication Union), or the ETSI (European Telecommunications Standards Institute), among others, both existing and not yet formulated.

Network interface circuitry/controller (NIC) 816 may be included to provide wired communication to the network 850 or to other devices using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 800 via NIC 816 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 816 may include one or more dedicated processors and/or FPGAs to communicate using one or more of the aforementioned network interface protocols. In some implementations, the NIC 816 may include multiple controllers to provide connectivity to other networks using the same or different protocols. For example, the system 800 may include a first NIC 816 providing communications to the cloud over Ethernet and a second NIC 816 providing communications to other devices over another type of network. In some implementations, the NIC 816 may be a high-speed serial interface (HSSI) NIC to connect the system 800 to a routing or switching device.

Network 850 comprises computers, network connections among various computers (e.g., between the system 800 and remote system 855), and software routines to enable communication between the computers over respective network connections. In this regard, the network 850 comprises one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 850 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 850 may require that the computers execute software routines which enable, for example, the seven layers of the OSI model of computer networking or equivalent in a wireless (or cellular) phone network.

The network 850 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the network 850 may be associated with network operator who owns or controls equipment and other elements necessary to provide network-related services, such as one or more base stations or access points, one or more servers for routing digital data or telephone calls (e.g., a core network or backbone network), etc. Other networks can be used instead of or in addition to the Internet, such as an intranet, an extranet, a virtual private network (VPN), an enterprise network, a non-TCP/IP based network, any LAN or WAN or the like.

The external interface 818 (also referred to as "I/O interface circuitry" or the like) is configurable or operable to connect or coupled the system 800 with external devices or subsystems. The external interface 818 may include any suitable interface controllers and connectors to couple the system 800 with the external components/devices. As an example, the external interface 818 may be an external expansion bus (e.g., Universal Serial Bus (USB), FireWire, Thunderbolt, etc.) used to connect system 800 with external (peripheral) components/devices. The external devices include, inter alia, sensor circuitry 821, actuators 822, and positioning circuitry 845, but may also include other devices or subsystems not shown by FIG. 8.

The sensor circuitry 821 may include devices, modules, or subsystems whose purpose is to detect events or changes in its environment and send the information (sensor data) about the detected events to some other a device, module, subsystem, etc. Examples of such sensors 621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 818 connects the system 800 to actuators 822, which allow system 800 to change its state, position, and/or orientation, or move or control a mechanism or system. The actuators 822 comprise electrical and/or mechanical devices for moving or controlling a mechanism or system, and/or converting energy (e.g., electric current or moving air and/or liquid) into some kind of motion. The actuators 822 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 822 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system 800 may be configurable or operable to operate one or more actuators 822 based on one or more captured events and/or instructions or control signals received from a service provider and/or various client systems. In embodiments, the system 800 may transmit instructions to various actuators 822 (or controllers that control one or more actuators 822) to reconfigure an electrical network as discussed herein.

The positioning circuitry 845 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-Technology for Positioning, Navigation, and Timing (Micro-PNT) IC that uses a master timing clock to perform position tracking/estimation without GNSS assistance. The positioning circuitry 845 may also be part of, or interact with, the communication circuitry 809 to communicate with the nodes and components of the positioning network. The positioning circuitry 845 may also provide position data and/or time data to the application circuitry, which may use the data to synchronize operations with various infrastructure (e.g., radio base stations), for turn-by-turn navigation, or the like.

The input/output (I/O) devices 856 may be present within, or connected to, the system 800. The I/O devices 856 include input device circuitry and output device circuitry including one or more user interfaces designed to enable user interaction with the system 800 and/or peripheral component interfaces designed to enable peripheral component interaction with the system 800. The input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the system 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more actuators 822 may be used as the output device circuitry (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 824 may be coupled to the system 800 to power the system 800, which may be used in embodiments where the system 800 is not in a fixed location, such as when the system 800 is a mobile or laptop client system. The battery 824 may be a lithium ion battery, a lead-acid automotive battery, or a metal-air battery, such as a zinc-air battery, an aluminum-air battery, a lithium-air battery, a lithium polymer battery, and/or the like. In embodiments where the system 800 is mounted in a fixed location, such as when the system is implemented as a server computer system, the system 800 may have a power supply coupled to an electrical grid. In these embodiments, the system 800 may include power tee circuitry to provide for electrical power drawn from a network cable to provide both power supply and data connectivity to the system 800 using a single cable.

Power management integrated circuitry (PMIC) 826 may be included in the system 800 to track the state of charge (SoCh) of the battery 824, and to control charging of the system 800. The PMIC 826 may be used to monitor other parameters of the battery 824 to provide failure predictions, such as the state of health (SoH) and the state of function (SoF) of the battery 824. The PMIC 826 may include voltage regulators, surge protectors, power alarm detection circuitry. The power alarm detection circuitry may detect one or more of brown out (under-voltage) and surge (over-voltage) conditions. The PMIC 826 may communicate the information on the battery 824 to the processor circuitry 802 over the IX 806. The PMIC 826 may also include an analog-to-digital (ADC) convertor that allows the processor circuitry 802 to directly monitor the voltage of the battery 824 or the current flow from the battery 824. The battery parameters may be used to determine actions that the system 800 may perform, such as transmission frequency, mesh network operation, sensing frequency, and the like.

A power block 828, or other power supply coupled to an electrical grid, may be coupled with the PMIC 826 to charge the battery 824. In some examples, the power block 828 may be replaced with a wireless power receiver to obtain the power wirelessly, for example, through a loop antenna in the system 800. In these implementations, a wireless battery charging circuit may be included in the PMIC 826. The specific charging circuits chosen depend on the size of the battery 824 and the current required.

The system 800 may include any combinations of the components shown by FIG. 8, however, some of the components shown may be omitted, additional components may be present, and different arrangement of the components shown may occur in other implementations. In one example where the system 800 is or is part of a server computer system, the battery 824, communication circuitry 809, the sensors 821, actuators 822, and/or POS 845, and possibly some or all of the I/O devices 856 may be omitted.

Furthermore, the embodiments of the present disclosure may take the form of a computer program product or data to create the computer program, with the computer program or data embodied in any tangible or non-transitory medium of expression having the computer-usable program code (or data to create the computer program) embodied in the medium. For example, the memory circuitry 804 and/or storage circuitry 808 may be embodied as non-transitory computer-readable storage media (NTCRSM) that may be suitable for use to store instructions (or data that creates the instructions) that cause an apparatus (such as any of the devices/components/systems described with regard to FIGS. 1-35), in response to execution of the instructions by the apparatus, to practice selected aspects of the present disclosure. As shown, NTCRSM may include a number of programming instructions 884, 882 (or data to create the programming instructions). Programming instructions 884, 882 may be configurable or operable to enable a device (e.g., any of the devices/components/systems described with regard to FIGS. 1-35), in response to execution of the programming instructions 884, 882, to perform various programming operations associated with operating system functions, one or more applications, and/or aspects of the present disclosure (including various programming operations associated with FIGS. 1-35). In various embodiments, the programming instructions 884, 882 may correspond to any of the computational logic 880, instructions 882 and 884 discussed previously with regard to FIG. 8.

In alternate embodiments, programming instructions 884, 882 (or data to create the instructions 884, 882) may be disposed on multiple NTCRSM. In alternate embodiments, programming instructions 884, 882 (or data to create the instructions 884, 882) may be disposed on computer-readable transitory storage media, such as, signals. The programming instructions 884, 882 embodied by a machine-readable medium may be transmitted or received over a communications network using a transmission medium via a network interface device (e.g., communication circuitry 809 and/or NIC 816 of FIG. 8) utilizing any one of a number of transfer protocols (e.g., HTTP, etc.).

Any combination of one or more computer usable or computer readable media may be utilized as or instead of the NTCRSM. The computer-usable or computer-readable medium may be, for example but not limited to, one or more electronic, magnetic, optical, electromagnetic, infrared, or semiconductor systems, apparatuses, devices, or propagation media. For instance, the NTCRSM may be embodied by devices described for the storage circuitry 808 and/or memory circuitry 804 described previously. More specific examples (a non-exhaustive list) of a computer-readable medium may include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. In the context of the present disclosure, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (e.g., including programming instructions 884, 882) or data to create the program code embodied therewith, either in baseband or as part of a carrier wave. The computer usable program code or data to create the program may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (e.g., programming instructions 884, 882) or data to create the program code as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code or data to create the program code may be stored in multiple parts, which are individually compressed, encrypted, and stored on separate computing devices, wherein the parts when decrypted, decompressed, and combined form a set of executable instructions that implement the program code or the data to create the program code, such as those described herein. In another example, the program code or data to create the program code may be stored in a state in which they may be read by a computer, but require addition of a library (e.g., a dynamic link library), a software development kit (SDK), an application programming interface (API), etc. in order to execute the instructions on a particular computing device or other device. In another example, the program code or data to create the program code may need to be configured (e.g., settings stored, data input, network addresses recorded, etc.) before the program code or data to create the program code can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code or data to create the program code are intended to encompass such machine readable instructions and/or program(s) or data to create such machine readable instruction and/or programs regardless of the particular format or state of the machine readable instructions and/or program(s) when stored or otherwise at rest or in transit.

The computer program code for carrying out operations of the present disclosure, including for example, programming instructions 884, 882, computational logic 880, instructions 882, and/or instructions 884, may be implemented as software code to be executed by one or more processors using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), ECMAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, Java-Server Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™ Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, Salesforce® Lightning®, and/or any other programming language, markup language, script, code, etc. In some implementations, a suitable integrated development environment (IDE) or software development kit (SDK) may be used to develop the program code or software elements discussed herein such as, for example, Android® Studio™ IDE, Apple® iOS® SDK, or development tools including proprietary programming languages and/or development tools. Furthermore, some or all of the software components or functions described herein can utilize a suitable querying language to query and store information in one or more databases or data structures, such as, for example, Structure Query Language (SQL), noSQL, and/or other query languages. The software code can be stored as a computer- or processor-executable instructions or commands on a physical non-transitory computer-readable medium. The computer program code for carrying out operations of the present disclosure may also be written in any combination of the programming languages discussed herein. The program code may execute entirely on the system 800, partly on the system 800 as a stand-alone software package, partly on the system 800 and partly on a remote computer (e.g., remote system 855), or entirely on the remote computer (e.g., remote system 855). In the latter scenario, the remote computer may be connected to the system 800 through any type of network (e.g., network 850).

The NTCRSM may also store information objects. Data formats define the content/data and/or the arrangement of data items for storing and/or communicating the information objects. Each of the data formats may also define the language, syntax, vocabulary, and/or protocols that govern information storage and/or exchange. Examples of the data formats that may be used for any of the information objects, including the schemas, data knowledge 109 (see e.g., FIG. 1), etc., may include Accelerated Mobile Pages Script (AMPscript), Abstract Syntax Notation One (ASN.1), Backus-Naur Form (BNF), extended BNF, Bencode, BSON, ColdFusion Markup Language (CFML), comma-separated values (CSV), Control Information Exchange Data Model (C2IEDM), Cascading Stylesheets (CSS), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca, Geography Markup Language (GML), Guide Template Language (GTL), Handlebars template language, Hypertext Markup Language (HTML), Interactive Financial Exchange (IFX), JAMscript, Java Script Object Notion (JSON), JSON Schema Language, Apache® MessagePack™, Mustache template language, Ontology Interchange Language (OIL), Open Service Interface Definition, Open Financial Exchange (OFX), Precision Graphics Markup Language (PGML), Google® Protocol Buffers (protobuf), Quicken® Financial Exchange (QFX), Regular Language for XML Next Generation (RelaxNG) schema language, regular expressions, Resource Description Framework (RDF) schema language, RESTful Service Description Language (RSDL), Scalable Vector Graphics (SVG), Schematron, VBScript, Web Application Description Language (WADL), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), Apache® Thrift, and/or any other language discussed elsewhere herein.

Additionally or alternatively, the data format for the information objects, schemas, data knowledge 109, etc., may be a Tactical Data Link (TDL) format including, for example, J-series message format for Link 16; JREAP messages; Multifuction Advanced Data Link (MADL), Integrated Broadcast Service/Common Message Format (IBS/CMF), Over-the-Horizon Targeting Gold (OTH-T Gold), Variable Message Format (VMF), United States Message Text Format (USMTF), and any future advanced TDL formats.

Additionally or alternatively, the data format for the information objects, schemas, etc., may be document and/or plain text, spreadsheet, graphics, and/or presentation formats including, for example, American National Standards Institute (ANSI) text, a Computer-Aided Design (CAD) application file format (e.g., ".c3d", ".dwg", ".dft", ".iam", ".iaw", ".tct", and/or other like file extensions), Google® Drive® formats (including associated formats for Google Docs®, Google Forms®, Google Sheets®, Google Slides®, etc.), Microsoft® Office® formats (e.g., ".doc", ".ppt", ".xls", ".vsd", and/or other like file extension), OpenDocument Format (including associated document, graphics, presentation, and spreadsheet formats), Open Office XML (OOXML) format (including associated document, graphics, presentation, and spreadsheet formats), Apple® Pages®, Portable Document Format (PDF), Question Object File Format (QUOX), Rich Text File (RTF), TeX and/or LaTeX (".tex" file extension), text file (TXT), TurboTax® file (".tax" file extension), You Need a Budget (YNAB) file, and/or any other like document or plain text file format.

The data format for some or all of the information objects may be archive file formats that store metadata and concatenate files, and may or may not compress the files for storage. As used herein, the term "archive file" refers to a file having a file format or data format that combines or concatenates one or more files into a single file or information object. Archive files often store directory structures, error detection and correction information, arbitrary comments, and sometimes use built-in encryption. The term "archive format" refers to the data format or file format of an archive file, and may include, for example, archive-only formats that store metadata and concatenate files, for example, including directory or path information; compression-only formats that only compress a collection of files; software package formats that are used to create software packages (including self-installing files), disk image formats that are used to create disk images for mass storage, system recovery, and/or other like purposes; and multi-function archive formats that can store metadata, concatenate, compress, encrypt, create error detection and recovery information, and package the archive into self-extracting and self-expanding files. For the purposes of the present disclosure, the term "archive file" may refer to an archive file having any of the aforementioned archive format types. Examples of archive file formats may include Android® Package (APK); Microsoft® Application Package (APPX); Genie Timeline Backup Index File (GBP); Graphics Interchange Format (GIF); gzip (.gz) provided by the GNU Project™; Java® Archive (JAR); Mike O'Brien Pack (MPQ) archives; Open Packaging Conventions (OPC) packages including OOXML files, OpenXPS files, etc.; Rar Archive (RAR); Red Hat® package/installer (RPM); Google® SketchUp backup File (SKB); TAR archive (".tar"); XPInstall or XPI installer modules; ZIP (.zip or .zipx); and/or the like.

While only a single computing device 800 is shown, the computing device 800 may include any collection of devices or circuitry that individually or jointly execute a set (or multiple sets) of instructions to perform any one or more of the operations discussed above. Computing device 800 may be part of an integrated control system or system manager, or may be provided as a portable electronic device configurable or operable to interface with a networked system either locally or remotely via wireless transmission.

Some of the operations described above may be implemented in software and other operations may be implemented in hardware. One or more of the operations, processes, or methods described herein may be performed by an apparatus, device, or system similar to those as described herein and with reference to the illustrated figures.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configurable or operable to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configurable or operable to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. "Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configurable or operable to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Although the various example embodiments and example implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

For the sake of convenience, operations may be described as various interconnected or coupled functional blocks or diagrams. However, there may be cases where these functional blocks or diagrams may be equivalently aggregated into a single logic device, program or operation with unclear boundaries. Having described and illustrated the principles of a preferred embodiment, it should be apparent that the embodiments may be modified in arrangement and detail without departing from such principles. Claim is made to all modifications and variation coming within the spirit and scope of the following claim.

The invention claimed is:

1. A computer system to be employed as a content consumption monitor, the computer system comprising:
   at least one processor; and
   a memory device communicatively coupled with the at least one processor, the memory device storing one or more sequences of instructions, and the at least one processor is to execute the one or more sequences of instructions to:
   identify users that accessed websites or content on websites from network session events associated with accessing the websites or the content, wherein the network session events at least identify network addresses from which the content or websites are accessed by the users or at least identify respective identifiers of the users;
   identify different topics in the websites or the content accessed by the users;
   generate user intent vectors for the users including relevancy values indicating user interest levels in the topics;
   identify a segment of the users associated with a same organization;
   generate an organization intent vector from the user intent vectors for the segment of users associated with the organization; and
   determine an organization interest level of the organization in the topics based on the organization intent vector.

2. The computer system of claim 1, wherein tags located in the content or webpages of the websites include instructions which cause computing devices to monitor and capture the network session events generated by the computing devices and send the captured network session events.

3. The computer system of claim 1, wherein the at least one processor is to execute the one or more sequences of instructions to:
   identify different segments of the users associated with different organizations; and
   generate different organization intent vectors from the user intent vectors for the different segments of users.

4. The computer system of claim 3, wherein the at least one processor is to execute the one or more sequences of instructions to:
in response to receipt of a query for organizations interested in specified topics, identify the organization intent vectors including relevancy values for the specified topics above a threshold value.

5. The computer system of claim 4, wherein the at least one processor is to execute the one or more sequences of instructions to:
repeatedly update the user intent vectors based on new network session events;
repeatedly update the organization intent vector with the updated user intent vectors for the segment of the users associated with the organization; and
repeatedly update the organizations interested in the specified topics based on the updated organization intent vector.

6. The computer system of claim 1, wherein the at least one processor is to execute the one or more sequences of instructions to:
group the network session events into a plurality of event sets, each event set of the plurality of event sets corresponding to a time period of a plurality of time periods; and
for each event set,
generate a set of user intent vectors from the event set,
generate an organization intent vector from the set of user intent vectors, and
determine the interest levels of the organization in a set of topics for the corresponding time period based on the organization intent vector for the event set.

7. The computer system of claim 1, wherein the at least one processor is to execute the one or more sequences of instructions to:
identify different geographic locations associated with the organization; and
generate different organization intent vectors from the user intent vector for the users associated with the organization at the different geographic locations.

8. The computer system of claim 7, wherein the at least one processor is to execute the one or more sequences of instructions to:
in response to receipt of a query to identify an interest level of the organization in a specified topic at a specified one of the geographic locations, identify the interest level of the organization for the specified topics at the specified one of the geographic locations based on one of the organization intent vectors associated with the specified one of the geographic locations.

9. The computer system of claim 1, wherein the at least one processor is to execute the one or more sequences of instructions to:
average the relevancy values in the user intent vectors for the segment of users associated with the same organization to generate the organization intent vector.

10. The computer system of claim 1, wherein the at least one processor is to execute the one or more sequences of instructions to:
identify the topics in the organization intent vector with relevancy values over a threshold value as topics of interest to the organization.

11. The computer system of claim 1, wherein the at least one processor is to execute the one or more sequences of instructions to:
assign weight values to respective events indicated by the network session events; and
apply the assigned weight values to corresponding ones of the relevancy values.

12. One or more non-transitory computer-readable media (NTCRM) comprising instructions, wherein execution of the instructions by one or more processors of a content consumption monitor (CCM) is operable to cause the CCM to:
receive network session events identifying actions of users accessing content on websites, and the network session events at least identifying network addresses from which the content or websites are accessed by the users or at least identifying respective identifiers of the users;
identify different topics in the websites, the webpages, or the content accessed by the users;
generate user intent vectors for the users including relevancy values indicating user interests in the topics;
identify users associated with same organizations among one or more organizations;
generate organization intent vectors for each of the one or more organization from the user intent vectors for the users associated with the same organizations; and
determine organization topics of interests as identified ones of the topics in the organization intent vector having relevancy values over a threshold value.

13. The one or more NTCRM of claim 12, wherein the websites or the content include tags located in the content or webpages of the websites, the tags including instructions which cause computing devices to monitor and capture the network session events generated by the computing devices and send the captured network session events to the content consumption monitor.

14. The one or more NTCRM of claim 12, wherein execution of the instructions is further operable to cause the CCM to:
identify users associated with respective geographic locations; and
determine the interests in the topics for the users from the user intent data associated with the users associated with the respective geographic locations.

15. The one or more NTCRM of claim 14, wherein execution of the instructions is further operable to cause the CCM to:
in response to receipt of a query to identify users in a specified geographic location interested in a specified topic, identify the users in the specified geographic location interested in the specified topics from the user intent data for the users associated with the specified geographic location.

16. The one or more NTCRM of claim 12, wherein execution of the instructions is further operable to cause the CCM to:
repeatedly update the user intent data with event data included in new network session events; and
repeatedly update the interests in the topics for the users based on the updated user intent data.

17. The one or more NTCRM of claim 12, wherein execution of the instructions is further operable to cause the CCM to:
identify different geographic locations associated with each of the one or more organizations; and
generate respective organization intent vectors from the user intent vectors for the users associated with each of the one or more organization at the different geographic locations.

18. The one or more NTCRM of claim 17, wherein execution of the instructions is further operable to cause the CCM to:

in response to receipt of a query to identify an interest level of at least one organization of the one or more organizations in a specified topic at a specified one of the geographic locations, identify the interest level of the at least one organization for the specified topics at the specified one of the geographic locations based on one of the organization intent vectors associated with the specified one of the geographic locations.

19. The one or more NTCRM of claim 12, wherein execution of the instructions is further operable to cause the CCM to:

average the relevancy values in the user intent vectors for the segment of users associated with the same organization to generate the organization intent vector.

20. The one or more NTCRM of claim 12, wherein execution of the instructions is further operable to cause the CCM to:

assign weight values to respective events indicated by the network session events; and apply the assigned weight values to corresponding ones of the relevancy values.

21. A computer system for operating a content consumption monitor, the computer system comprising:

at least one processor; and at least one memory device storing program code of a content consumption monitor, wherein execution of the program code by the at least one processor is operable to cause the computer system to:

obtain network session events identifying websites, webpages, or content accessed by users on websites, and the network session events at least identifying network addresses from which the content or websites are accessed by the users or at least identifying respective identifiers of the users;

identify different topics in the content, the webpages, or the websites accessed by the users;

generate user intent data structures for the users including relevancy values indicating user interest in the topics;

identify users associated with same organizations (orgs) of a set of orgs;

generate org intent data structures for each org of the set of orgs from the user intent data structures for the users associated with the same orgs; and determine, for each org, an org intent related to the topics based on respective org data structures.

22. The computer system of claim 21, wherein the websites, webpages, or content include tags, the tags including instructions which cause computing devices to monitor and capture the network session events generated by the computing devices and send the captured network session events to the content consumption monitor from tags located in content or webpages.

23. The computer system of claim 21, wherein execution of the program code is further operable to cause the computer system to:

identify different geographic locations associated with the user intent data structures; and aggregate the user intent data structures associated with same geographic locations and the same orgs to generate the org intent data structures for the different geographic locations.

* * * * *